US012211277B2

(12) United States Patent
Chen et al.

(10) Patent No.: US 12,211,277 B2
(45) Date of Patent: Jan. 28, 2025

(54) INTERACTIVE VIDEO SURVEILLANCE AS AN EDGE SERVICE USING UNSUPERVISED FEATURE QUERIES

(71) Applicant: The Research Foundation for The State University of new York, Binghamton, NY (US)

(72) Inventors: Yu Chen, Vestal, NY (US); Seyed Yahya Nikouei, Greensboro, NC (US)

(73) Assignee: The Research Foundation for The State University of New York, Binghamton, NY (US)

( * ) Notice: Subject to any disclaimer, the term of this patent is extended or adjusted under 35 U.S.C. 154(b) by 498 days.

(21) Appl. No.: 17/690,610

(22) Filed: Mar. 9, 2022

(65) Prior Publication Data

US 2022/0292827 A1  Sep. 15, 2022

Related U.S. Application Data

(60) Provisional application No. 63/158,806, filed on Mar. 9, 2021.

(51) Int. Cl.
*G06K 9/00* (2022.01)
*G06F 16/78* (2019.01)
(Continued)

(52) U.S. Cl.
CPC ............ *G06V 20/46* (2022.01); *G06F 16/785* (2019.01); *G06F 16/7854* (2019.01);
(Continued)

(58) Field of Classification Search
None
See application file for complete search history.

(56) References Cited

U.S. PATENT DOCUMENTS 10,410,097 B2 * 9/2019 Mazzarella ...... G08B 13/19641
10,755,128 B2 * 8/2020 Turkelson ............. G06T 1/0014
(Continued)

OTHER PUBLICATIONS

Yousefpour et al., "All one needs to know about fog computing and related edge computing paradigms: A complete survey." Journal of Systems Architecture 98 (2019): 289-330. (Year: 2019).*
(Continued)

*Primary Examiner* — Feng Niu
(74) *Attorney, Agent, or Firm* — Hoffberg & Associates; Steven M. Hoffberg

(57) ABSTRACT

A method for querying data obtained from a distributed sensor network, comprising: receiving sensor data representing an aspect of an environment with a sensor of the distributed sensor network; communicating a representation of the sensor data to a fog node through an automated communication network; determining, by the fog node, a correspondence of a query received through the automated communication network to characteristics of the representation of the sensor data; and selectively communicating, in response to the query, at least one of: the sensor data having the determined characteristics corresponding to the query, an identification of the sensor data having the determined characteristics corresponding to the query, and the data representing the sensor data having the determined characteristics corresponding to the query.

20 Claims, 13 Drawing Sheets

(51) Int. Cl.
*G06F 16/783* (2019.01)
*G06V 10/94* (2022.01)
*G06V 20/40* (2022.01)
*G06V 20/52* (2022.01)
*G06V 40/10* (2022.01)

(52) U.S. Cl.
CPC ........ *G06F 16/786* (2019.01); *G06F 16/7867* (2019.01); *G06V 10/95* (2022.01); *G06V 20/41* (2022.01); *G06V 20/52* (2022.01); *G06V 40/103* (2022.01)

(56) References Cited

U.S. PATENT DOCUMENTS

| | | | | |
|---|---|---|---|---|
| 10,769,503 | B1* | 9/2020 | Buhler | G06F 16/56 |
| 10,839,196 | B2* | 11/2020 | Friedland | G06F 16/583 |
| 10,956,721 | B2* | 3/2021 | Tusch | G06V 20/52 |
| 11,397,462 | B2* | 7/2022 | Eledath | G06F 3/011 |
| 11,854,266 | B2* | 12/2023 | Nadler | G06V 20/52 |
| 2016/0350583 | A1* | 12/2016 | Nishino | G06V 40/172 |
| 2016/0378861 | A1* | 12/2016 | Eledath | G06V 20/52 707/766 |
| 2017/0068945 | A1* | 3/2017 | Tsuchimochi | G06V 20/52 |
| 2017/0351940 | A1* | 12/2017 | Mazzarella | G08B 13/19641 |
| 2018/0005037 | A1* | 1/2018 | Smith, IV | G06V 20/64 |
| 2018/0018508 | A1* | 1/2018 | Tusch | G06V 20/52 |
| 2018/0024633 | A1* | 1/2018 | Lo | H04N 23/69 345/156 |
| 2019/0146991 | A1* | 5/2019 | Sato | G06V 40/103 382/224 |
| 2019/0174099 | A1* | 6/2019 | Hodge | G11B 20/0021 |
| 2019/0325198 | A1* | 10/2019 | Friedland | G08B 13/196 |
| 2020/0193206 | A1* | 6/2020 | Turkelson | H04N 25/00 |
| 2020/0409998 | A1* | 12/2020 | Chen | G06F 16/907 |
| 2021/0027448 | A1* | 1/2021 | Cohen | G06T 7/70 |
| 2021/0279475 | A1* | 9/2021 | Tusch | H04L 63/0861 |
| 2022/0122361 | A1* | 4/2022 | Nadler | G06V 10/22 |
| 2022/0215205 | A1* | 7/2022 | Swaminathan | G06F 18/214 |
| 2024/0249556 | A1* | 7/2024 | Tusch | G06V 20/52 |

OTHER PUBLICATIONS

Nasir et al., "Fog computing enabled cost-effective distributed summarization of surveillance videos for smart cities," J. Parallel Distrib. Comput., vol. 126, pp. 161-170, Apr. 2019. (Year: 2019).*

Din et al., "Service Orchestration of Optimizing Continuous Features in Industrial Surveillance Using Big Data Based Fog-Enabled Internet of Things," in IEEE Access, vol. 6, pp. 21582-21591, 2018, doi: 10.1109/ACCESS.2018.2800758. (Year: 2018).*

Miraftabzadeh et al., "A Privacy-Aware Architecture at the Edge for Autonomous Real-Time Identity Reidentification in Crowds," in IEEE Internet of Things Journal, vol. 5, No. 4, pp. 2936-2946, Aug. 2018, doi: 10.1109/JIOT.2017.2761801. (Year: 2018).*

* cited by examiner

| Color | HTML / CSS Name | Hex Code #RRGGBB | Decimal Code (R,G,B) |
|---|---|---|---|
| | Black | #000000 | (0,0,0) |
| | White | #FFFFFF | (255,255,255) |
| | Red | #FF0000 | (255,0,0) |
| | Lime | #00FF00 | (0,255,0) |
| | Blue | #0000FF | (0,0,255) |
| | Yellow | #FFFF00 | (255,255,0) |
| | Cyan / Aqua | #00FFFF | (0,255,255) |
| | Magenta / Fuchsia | #FF00FF | (255,0,255) |
| | Silver | #C0C0C0 | (192,192,192) |
| | Gray | #808080 | (128,128,128) |
| | Maroon | #800000 | (128,0,0) |
| | Olive | #808000 | (128,128,0) |
| | Green | #008000 | (0,128,0) |
| | Purple | #800080 | (128,0,128) |
| | Teal | #008080 | (0,128,128) |
| | Navy | #000080 | (0,0,128) |

Fig. 7

Center 1: 206, 214, 219 Lightgrey → Grey

Center 2: 174, 188, 180 Silver → Silver

Center 1: 139, 78, 106 Darkblueslate → Purple

Center 2: 74, 41, 53 Indigo → Purple

Center 1: 122, 113, 114 Dimgrey → Grey

Center 2: 52, 47, 49 Darkgrey → Grey

1

INTERACTIVE VIDEO SURVEILLANCE AS AN EDGE SERVICE USING UNSUPERVISED FEATURE QUERIES

CROSS REFERENCE TO RELATED APPLICATIONS

The present application is a non-provisional of, and claims benefit of priority from, U.S. Provisional Patent Application No. 63/158,806, filed Mar. 9, 2021, the entirety of which is expressly incorporated herein by reference.

FIELD OF THE INVENTION

The disclosure relates generally to video surveillance, and more particularly, to systems and methods for real-time video querying and objects of interest detection.

INCORPORATION BY REFERENCE

Citation or identification of any reference herein, or any section of this application shall not be construed as an admission that such reference is available as prior art. The disclosure of each publication and patent listed or referenced herein are hereby incorporated by reference in their entirety in this application, see 37 C.F.R. § 1.57(c), and shall be treated as if the entirety thereof forms a part of this application. Such references are provided for their disclosure of technologies as may be required to enable practice of the present invention, to provide written description for claim language, to make clear applicant's possession of the invention with respect to the various aggregates, combinations, permutations, and subcombinations of the respective disclosures or portions thereof (within a particular reference or across multiple references) in conjunction with the combinations, permutations, and subcombinations of various disclosure provided herein, to demonstrate the non-abstract nature of the technology, and for any other purpose. Except as expressly indicated, the scope of the invention is inclusive, and therefore the disclosure of a technology or teaching within these incorporated materials is intended to encompass that technology or teaching as being an option of, or an addition to, other disclosure of the present invention. Likewise, the combination of incorporated teachings consistent with this disclosure is also encompassed. The citation of references is intended to be part of the disclosure of the invention, and not merely supplementary background information. While cited references may be prior art, the combinations thereof and with the material disclosed herein is not admitted as being prior art.

The incorporation by reference does not extend to teachings which are inconsistent with the invention as expressly described herein as being essential. The incorporated references are rebuttable evidence of a proper interpretation of terms, phrases, and concepts employed herein by persons of ordinary skill in the art. No admission is made that any incorporated reference is analogous art to the issues presented to the inventor, and the selection, combination, and disclosure of these disparate teachings is itself a part of the invention herein disclosed.

BACKGROUND OF THE INVENTION

Smart Cities pervasively deploy video cameras for information collection and Situation Awareness (SAW). While cameras enable 24-7 continuous collection of city footprints, the huge amount of video data brings new challenges, among which the top two are the scalability and privacy. As streaming video increases, it becomes infeasible to have human operators sitting in front of hundreds of screens to catch suspicious activities or identify objects of interest in real-time. Actually, with millions of surveillance cameras deployed, video search is more vital than ever. For example, it is very time-consuming for the operator to find a specific scene where a certain action took place among hundreds of hours of video streams. As from the experimental collection, when a security officer is looking for a suspicious person on the run, the cameras are not adequately responsive. In collection scenarios, a method that allows real-time video querying and facilitates thousands of frames and performs instant object identification is desperately needed, which is able to look through thousands of frames and identify the object of interest instantly. Meanwhile, many people are very much concerned, some are even paranoid about the invasion of their privacy by the cameras from streets, stores, and in the community.

Smart Cities pervasively deploy video cameras for information collection and Situation Awareness (SAW). While cameras enable 24-7 continuous collection of city footprints, the huge amount of video data brings new challenges, among which the top two are the scalability and privacy. As streaming video increases, it becomes infeasible to have human operators sitting in front of hundreds of screens to catch suspicious activities or identify objects of interests in real-time. Actually, with millions of surveillance cameras deployed, video search is more vital than ever. For example, it is very time consuming for the operator to find a specific scene where a certain action took place among hundreds of hours of video streams. As from the experimental collection, when a security officer is looking for a suspicious person on the run, the cameras are not adequately responsive. In collection scenarios, a method is desired that allows real-time video querying and facilitates thousands of frames and performs instant object identification, which is able to look through thousands of frames and identify the object of interest instantly. Meanwhile, many people are very much concerned, some are even paranoid about the invasion of their privacy by the cameras from streets, stores, and in the community.

Security surveillance may be enhanced through efficient design of queryable operations. The query responses selectively highlights meaningful content and instantly provides interactive knowledge of mission-critical tasks.

An ideal security surveillance algorithm is expected to fulfill the following functions without violating people's privacy: (1) identify the object of interest, (2) match the video frames with the description query, and (3) report the camera identification (ID) or geo-location. Although face recognition-based approaches are very mature today, it brings up deep concerns on privacy violation. In many practical application scenarios like public safety monitoring, features of objects of interest may be much more complicated than facial feature recognition. In addition, the operators may not be always able to provide simple, concise, and accurate queries. Actually, it is more often that operators merely provide rough, general, and uncertain descriptions of certain suspicious objects or accidents. Because of the tight constraints on time delays and communication network bandwidth, it is not practical to outsource the huge amount of raw video streams to a cloud center to instantly process the queries. Instead, edge computing is a promising solution. Edge computing allows computational tasks conducted by smart Internet of Things (IoT) devices on-site or near-site, which enables instant information procession and decision-making.

Human pose estimation, which refers to the keypoint detection on the body of the subject, is a long-standing research area. Using manually selected features is insufficient in locating the body parts effectively. More recent convolutional approaches, in which the machine extracts the features, drastically improved performance. There are two main methods of human recognition including a single person pipeline or the multi-person pipeline. The single person category is further divided to heat-map generation where each pixel shows the probability of a likely keypoint. The heat map examples derive from Generative Adversarial Networks (GAN), "Stacked Hourglass" model, or Convolutional Pose Machines (CPM). Another approach is regression on the feature map to the keypoint locations.

en.wikipedia.org/wiki/Generative_adversarial_network

Creswell, Antonia, Tom White, Vincent Dumoulin, Kai Arulkumaran, Biswa Sengupta, and Anil A. Bharath. "Generative adversarial networks: An overview." IEEE Signal Processing Magazine 35, no. 1 (2018): 53-65.

Wang, Kunfeng, Chao Gou, Yanjie Duan, Yilun Lin, Xinhu Zheng, and Fei-Yue Wang. "Generative adversarial networks: introduction and outlook." IEEE/CAA Journal of Automatica Sinica 4, no. 4 (2017): 588-598.

Metz, Luke, Ben Poole, David Pfau, and Jascha Sohl-Dickstein. "Unrolled generative adversarial networks." arXiv preprint arXiv:1611.02163 (2016).

Liu, Ming-Yu, and Oncel Tuzel. "Coupled generative adversarial networks." Advances in neural information processing systems 29 (2016).

Mao, Xudong, Qing Li, Haoran Xie, Raymond Y K Lau, Zhen Wang, and Stephen Paul Smolley. "Least squares generative adversarial networks." In Proceedings of the IEEE international conference on computer vision, pp. 2794-2802. 2017.

Karras, Tero, Samuli Laine, and Timo Aila. "A style-based generator architecture for generative adversarial networks." In Proceedings of the IEEE/CVF conference on computer vision and pattern recognition, pp. 4401-4410. 2019.

Arjovsky, Martin, and Leon Bottou. "Towards principled methods for training generative adversarial networks." arXiv preprint arXiv:1701.04862 (2017).

Miyato, Takeru, Toshiki Kataoka, Masanori Koyama, and Yuichi Yoshida. "Spectral normalization for generative adversarial networks." arXiv preprint arXiv:1802.05957 (2018).

Berthelot, David, Thomas Schumm, and Luke Metz. "Began: Boundary equilibrium generative adversarial networks." arXiv preprint arXiv:1703.10717 (2017).

Goodfellow, Ian. "Nips 2016 tutorial: Generative adversarial networks." arXiv preprint arXiv:1701.00160 (2016).

Hong, Yongjun, Uiwon Hwang, Jaeyoon Yoo, and Sungroh Yoon. "How generative adversarial networks and their variants work: An overview." ACM Computing Surveys (CSUR) 52, no. 1 (2019): 1-43.

Antoniou, Antreas, Amos Storkey, and Harrison Edwards. "Data augmentation generative adversarial networks." arXiv preprint arXiv:1711.04340 (2017).

Yoon, Jinsung, Daniel Jarrett, and Mihaela Van der Schaar. "Time-series generative adversarial networks." Advances in Neural Information Processing Systems 32 (2019).

Chen, Yang, Yu-Kun Lai, and Yong-Jin Liu. "Cartoongan: Generative adversarial networks for photo cartoonization." In Proceedings of the IEEE conference on computer vision and pattern recognition, pp. 9465-9474. 2018.

Wang, Chaoyue, Chang Xu, Xin Yao, and Dacheng Tao. "Evolutionary generative adversarial networks." IEEE Transactions on Evolutionary Computation 23, no. 6 (2019): 921-934.

Karras, Tero, Miika Aittala, Janne Hellsten, Samuli Laine, Jaakko Lehtinen, and Timo Aila. "Training generative adversarial networks with limited data." Advances in Neural Information Processing Systems 33 (2020): 12104-12114.

Huang, Xun, Yixuan Li, Omid Poursaeed, John Hoperoft, and Serge Belongie. "Stacked generative adversarial networks." In Proceedings of the IEEE conference on computer vision and pattern recognition, pp. 5077-5086. 2017.

Gui, Jie, Zhenan Sun, Yonggang Wen, Dacheng Tao, and Jieping Ye. "A review on generative adversarial networks: Algorithms, theory, and applications." IEEE Transactions on Knowledge and Data Engineering (2021).

Radford, Alec, Luke Metz, and Soumith Chintala. "Unsupervised representation learning with deep convolutional generative adversarial networks." arXiv preprint arXiv:1511.06434 (2015).

Odena, Augustus. "Semi-supervised learning with generative adversarial networks." arXiv preprint arXiv:1606.01583 (2016).

Park, Noseong, Mahmoud Mohammadi, Kshitij Gorde, Sushil Jajodia, Hongkyu Park, and Youngmin Kim. "Data synthesis based on generative adversarial networks." arXiv preprint arXiv:1806.03384 (2018).

Yang, Jing, Qingshan Liu, and Kaihua Zhang. "Stacked hourglass network for robust facial landmark localisation." In Proceedings of the IEEE Conference on Computer Vision and Pattern Recognition Workshops, pp. 79-87. 2017.

Newell, Alejandro, Kaiyu Yang, and Jia Deng. "Stacked hourglass networks for human pose estimation." In European conference on computer vision, pp. 483-499. Springer, Cham, 2016.

Xu, Tianhan, and Wataru Takano. "Graph stacked hourglass networks for 3d human pose estimation." In Proceedings of the IEEE/CVF Conference on Computer Vision and Pattern Recognition, pp. 16105-16114. 2021.

Kim, Seung-Taek, and Hyo Jong Lee. "Lightweight stacked hourglass network for human pose estimation." Applied Sciences 10, no. 18 (2020): 6497.

Fani, Mehrnaz, Helmut Neher, David A. Clausi, Alexander Wong, and John Zelek. "Hockey action recognition via integrated stacked hourglass network." In Proceedings of the IEEE conference on computer vision and pattern recognition workshops, pp. 29-37. 2017.

Kumari, Seema, Ranjeet Ranjhan Jha, Arnav Bhaysar, and Aditya Nigam. "AUTODEPTH: Single image depth map estimation via residual CNN encoder-decoder and stacked hourglass." In 2019 IEEE International Conference on Image Processing (ICIP), pp. 340-344. IEEE, 2019.

Zhang, Junfeng, Haifeng Hu, and Guobin Shen. "Joint Stacked Hourglass Network and Salient Region Attention Refinement for Robust Face Alignment." ACM Transactions on Multimedia Computing, Communications, and Applications (TOMM) 16, no. 1 (2020): 1-18.

Hua, Guoguang, Lihong Li, and Shiguang Liu. "Multipath affinage stacked—hourglass networks for human pose estimation." Frontiers of Computer Science 14, no. 4 (2020): 1-12.

Peng, Gang, Yuezhi Zheng, Jianfeng Li, and Jin Yang. "A single upper limb pose estimation method based on the improved stacked hourglass network." International Journal of Applied Mathematics and Computer Science 31, no. 1 (2021): 123-133.

Storey, Gary, Ahmed Bouridane, Richard Jiang, and Chang-Tsun Li. "Atypical facial landmark localisation with stacked hourglass networks: a study on 3D facial modelling for medical diagnosis." In Deep Biometrics, pp. 37-49. Springer, Cham, 2020.

Shi, Husen, and Zengfu Wang. "Improved stacked hourglass network with offset learning for robust facial landmark detection." In 2019 9th International Conference on Information Science and Technology (ICIST), pp. 58-64. IEEE, 2019.

Elhagry, Ahmed, Mohamed Saeed, and Musie Araia. "Lighter Stacked Hourglass Human Pose Estimation." arXiv preprint arXiv:2107.13643 (2021).

Hu, Tao, Chunxia Xiao, Geyong Min, and Noushin Najjari. "An adaptive stacked hourglass network with Kalman filter for estimating 2D human pose in video." Expert Systems 38, no. 5 (2021): e12552.

Zhang, Junfeng, and Haifeng Hu. "Stacked Hourglass Network Joint with Salient Region Attention Refinement for Face Alignment." In 2019 14th IEEE International Conference on Automatic Face & Gesture Recognition (FG 2019), pp. 1-7. IEEE, 2019.

Hong, Zhibin, Hanqi Guo, Ziyuan Guo, Yanqin Chen, Bi Li, and Teng Xi. "Facial landmark localization based on auto-stacked hourglass network and expectation consensus." In 2019 IEEE International Conference on Multimedia & Expo Workshops (ICMEW), pp. 661-664. IEEE, 2019.

Liang, Dongbao, Jiale Xiao, Yangbin Yu, and Tao Su. "A CNN Hardware Accelerator in FPGA for Stacked Hourglass Network." In Conference on Advanced Computer Architecture, pp. 101-116. Springer, Singapore, 2020.

Guo, Chunsheng, Wenlong Du, and Na Ying. "Multi-Scale Stacked Hourglass Network for Human Pose Estimation." (2018).

Li, Kun, Hui Zhang, and Lei Peng. "Improved Stacked Hourglass Network for Robust 6D Object Pose Estimation." In 2021 International Symposium on Electrical, Electronics and Information Engineering, pp. 442-446. 2021.

Wei, Shih-En, Varun Ramakrishna, Takeo Kanade, and Yaser Sheikh. "Convolutional pose machines." In Proceedings of the IEEE conference on Computer Vision and Pattern Recognition, pp. 4724-4732. 2016.

Qiang, Baohua, Shihao Zhang, Yongsong Zhan, Wu Xie, and Tian Zhao. "Improved convolutional pose machines for human pose estimation using image sensor data." Sensors 19, no. 3 (2019): 718.

Osokin, Daniil. "Global context for convolutional pose machines." arXiv preprint arXiv:1906.04104 (2019).

Cao, Yuanzhouhan, Olivier Canévet, and Jean-Marc Odobez. "Leveraging convolutional pose machines for fast and accurate head pose estimation." In 2018 IEEE/RSJ International Conference on Intelligent Robots and Systems (IROS), pp. 1089-1094. IEEE, 2018.

Wei, Shih-En. "Convolutional pose machines: a deep architecture for estimating articulated poses." In IEEE Conference on Computer Vision and Pattern Recognition. 2016.

Luo, Yue, Jimmy Ren, Zhouxia Wang, Wenxiu Sun, Jinshan Pan, Jianbo Liu, Jiahao Pang, and Liang Lin. "Lstm pose machines." In Proceedings of the IEEE conference on computer vision and pattern recognition, pp. 5207-5215. 2018.

O'Sullivan, Eimear. "Extending Convolutional Pose Machines for Facial Landmark Localization in 3D Point Clouds." In Proceedings of the IEEE/CVF International Conference on Computer Vision Workshops, pp. 0-0. 2019.

He, Jian, Cheng Zhang, Xinlin He, and Ruihai Dong. "Visual recognition of traffic police gestures with convolutional pose machine and handcrafted features." Neurocomputing 390 (2020): 248-259.

Wu, Yueh, and Chien-Min Wang. "Applying hand gesture recognition and joint tracking to a TV controller using CNN and Convolutional Pose Machine." In 2018 24th International Conference on Pattern Recognition (ICPR), pp. 3086-3091. IEEE, 2018.

Kumar, Amit, and Rama Chellappa. "A convolution tree with deconvolution branches: Exploiting geometric relationships for single shot keypoint detection." arXiv preprint arXiv:1704.01880 (2017).

Peng, Sida, Yuan Liu, Qixing Huang, Xiaowei Zhou, and Hujun Bao. "Pvnet: Pixel-wise voting network for 6dof pose estimation." In Proceedings of the IEEE/CVF Conference on Computer Vision and Pattern Recognition, pp. 4561-4570. 2019.

Sofka, Michal, Fausto Milletari, Jimmy Jia, and Alex Rothberg. "Fully convolutional regression network for accurate detection of measurement points." In Deep learning in medical image analysis and multimodal learning for clinical decision support, pp. 258-266. Springer, Cham, 2017.

Honari, Sina, Jason Yosinski, Pascal Vincent, and Christopher Pal. "Recombinator networks: Learning coarse-to-fine feature aggregation." In Proceedings of the IEEE conference on computer vision and pattern recognition, pp. 5743-5752. 2016.

Ke, Lipeng, Ming-Ching Chang, Honggang Qi, and Siwei Lyu. "Multi-scale structure-aware network for human pose estimation." In Proceedings of the european conference on computer vision (ECCV), pp. 713-728. 2018.

Liu, Zechen, Zizhang Wu, and Roland Toth. "Smoke: Single-stage monocular 3d object detection via keypoint estimation." In Proceedings of the IEEE/CVF Conference on Computer Vision and Pattern Recognition Workshops, pp. 996-997. 2020.

Gupta, Aryaman, Kalpit Thakkar, Vineet Gandhi, and P. J. Narayanan. "Nose, eyes and ears: Head pose estimation by locating facial keypoints." In ICASSP 2019-2019 IEEE International Conference on Acoustics, Speech and Signal Processing (ICASSP), pp. 1977-1981. IEEE, 2019.

Zhang, Junfeng, Haifeng Hu, and Shenming Feng. "Robust facial landmark detection via heatmap-offset regression." IEEE Transactions on Image Processing 29 (2020): 5050-5064.

U.S. patent and patent application Nos. 20220067530; 20220067512; 20220067417; 20220067445; 20220067368; 20220058815; 20220057791; 20220051403; 20220044719; 20220036123; 20220024577; 11232647; 20220018715; 20220020145; 20220014450; 20220005332; 20220004897; 20220004882; 20220004923; 20210407041; 11210775; 20210396730; 20210397961; 20210398654; 20210397970; 20210390419; 20210390319; 20210392271; 20210383193; 20210383241; 20210385463; 20210374786; 20210374976; 20210365707; 20210357655; 20210354721; 20210357772; 20210352087; 20210350116; 11164312; 20210326576; 20210319363; 20210319313; 20210318202; 20210318458;

20210312200; 20210312591; 20210297585; 20210295581; 20210286800; 20210287093; 20210287050; 20210279804; 20210281878; 20210279519; 20210271360; 20210273967; 20210272086; 20210269060; 20210268653; 11106903; 20210264205; 20210265018; 20210256720; 20210248748; 20210240851; 20210240195; 20210232803; 20210233204; 11074501; 20210224595; 20210224606; 11068746; 20210216857; 20210213616; 20210209388; 20210209797; 20210209785; 20210203803; 20210192175; 11042779; 20210183508; 11037278; 20210174093; 20210173916; 20210174197; 20210158540; 20210160509; 20210158430; 11019366; 20210150357; 20210150769; 20210152834; 20210150369; 20210152583; 20210142113; 20210124977; 20210117733; 20210117686; 20210113130; 20210117774; 10984225; 20210109971; 20210110198; 20210104067; 20210097277; 20210089055; 10956785; 20210081653; 20210081757; 20210081549; 20210076016; 20210073584; 20210067549; 20210067744; 20210058936; 20210049772; 20210049468; 20210041596; 20210042643; 20210042503; 20210027759; 20210027094; 20210027890; 20210019627; 20210019632; 20210012242; 20210012093; 10887613; 20200410274; 20200401793; 10860115; 20200380701; 10849532; 20200372282; 20200364562; 20200365231; 10839594; 10839269; 20200334835; 10810501; 20200327415; 20200327731; 20200320402; 20200285896; 20200272905; 10755112; 20200265336; 20200265602; 20200265032; 20200244969; 20200242154; 20200226790; 20200226421; 20200228880; 20200211159; 20200200872; 20200204546; 20200204375; 20200202177; 10692002; 20200189117; 20200193607; 20200193793; 20200183047; 20200183035; 20200183032; 20200183041; 20200184200; 20200160176; 20200151222; 20200134804; 20200125822; 20200125982; 10611497; 20200104574; 20200097766; 20200089994; 20200090001; 20200073968; 20200074674; 20200057965; 20200051565; 20200043171; 20200036528; 20200019699; 20200021865; 20200019921; 10535146; 20200013190; 20200005090; 20190392596; 20190384964; 20190385018; 20190385302; 20190373293; 20190325060; 20190311367; 20190304157; 20190304076; 20190293765; 20190294149; 20190294871; 20190287654; 20190256924; 20190259033; 20190252073; 20190244107; 10346969; 20190188830; 10325201; 10282852; 20190095795; 20190066493; 20190065901; 20190050534; 20190050942; 10176405; 20180367484; 20180367483; 20180336439; 20180268202; 20180268284; 10053236; 20180165554; 20180083898; 20180083901; and 20180075581.

The multi-person detection pipeline can be divided into Top-down approaches and Bottom-up approaches. Top-down methods detect each person and then recognize each person's keypoints. Bottom-up methods have reversed order of steps: the first step is to locate all the keypoints in an image and then to group these keypoints according to the person they belong to. Recently, researchers also tried to find the whole-body estimation using only a single network, which improves the performance drastically compared to the well-known OpenPose. The model uses VGG19 architecture for convolution filter layers. See, Carvalho, Tiago, Edmar R S De Rezende, Matheus T P Alves, Fernanda K C Balieiro, and Ricardo B. Sovat. "Exposing computer generated images by eye's region classification via transfer learning of VGG19 CNN." In 2017 16th IEEE International Conference on Machine Learning and Applications (ICMLA), pp. 866-870. IEEE, 2017.

Letchmunan, Sukumar, Fadratul Hafinaz Hassan, Sultan Zia, and Anees Baqir. "Detecting Video Surveillance Using VGG19 Convolutional Neural Networks."

Akiyama, Tatsuhiro, Yosuke Kobayashi, Jay Kishigami, and Kenji Muto. "CNN-based boat detection model for alert system using surveillance video camera." In 2018 IEEE 7th Global Conference on Consumer Electronics (GCCE), pp. 669-670. IEEE, 2018.

Rajeshwari, M., and C. H. MallikarjunaRao. "Detecting anomalous road traffic conditions using VGG19 CNN Model." In E3S Web of Conferences, vol. 309. EDP Sciences, 2021.

Gonzalez-Trejo, Javier, and Diego Mercado-Ravell. "Dense crowds detection and surveillance with drones using density maps." In 2020 International Conference on Unmanned Aircraft Systems (ICUAS), pp. 1460-1467. IEEE, 2020.

Sharma, Manan, and Rishabh Baghel. "Video surveillance for violence detection using deep learning." In Advances in data science and management, pp. 411-420. Springer, Singapore, 2020.

Manju, D., M. Seetha, and P. Sammulal. "Analysis of Deep Learning Models for Early Action Prediction Using LSTM." In Inventive Computation and Information Technologies, pp. 879-888. Springer, Singapore, 2022.

Zahid, Muhammad, Muhammad Attique Khan, Faisal Azam, Muhammad Sharif, Seifedine Kadry, and Jnyana Ranjan Mohanty. "Pedestrian identification using motion-controlled deep neural network in real-time visual surveillance." Soft Computing (2021): 1-17.

Thippesha, D., and B. R. Pramodh. "Deep Learning-Based Pest Surveillance System for Sericulture."

Chen, Xiang, Linbo Qing, Xiaohai He, Jie Su, and Yonghong Peng. "From eyes to face synthesis: a new approach for human-centered smart surveillance." IEEE access 6 (2018): 14567-14575.

Bouhsissin, Soukaina, Nawal Sael, and Faouzia Benabbou. "Enhanced VGG19 Model for Accident Detection and Classification from Video." In 2021 International Conference on Digital Age & Technological Advances for Sustainable Development (ICDATA), pp. 39-46. IEEE, 2021.

Navalgund, Umadevi V., and K. Priyadharshini. "Crime intention detection system using deep learning." In 2018 International Conference on Circuits and Systems in Digital Enterprise Technology (ICCSDET), pp. 1-6. IEEE, 2018.

Zhang, Edward. "A Real-Time Deep Transfer Learning Model for Facial Mask Detection." In 2021 Integrated Communications Navigation and Surveillance Conference (ICNS), pp. 1-7. IEEE, 2021.

Thomazella, Rogério, J. E. Castanho, Fèbio R L Dotto, O P Rodrigues Júnior, Gustavo Henrique Rosa, Aparecido Nilceu Marana, and Joao P. Papa. "Environmental monitoring using drone images and convolutional neural networks." In IGARSS 2018-2018 IEEE International Geoscience and Remote Sensing Symposium, pp. 8941-8944. Ieee, 2018.

U.S. patent and patent application Nos. 20220067344; 20220067357; 20220067420; 20220067882; 20220067911; 20220066544; 20220067410; 11263780; 20220054925; 20220051541; 20220044070; 20220044311; 20220031195; 20220036050; 20220036617; 20220036534; 20220036371; 20220036054; 20220036074; 11238634; 20220029972; 20220030214; 20220012502; 20220012879; 20220001544; 20210406604; 20210406528; 20210401298; 20210395039; 11205082; 20210386359; 20210390288; 20210390748; 20210390945; 11200689; 20210383169; 11194330; 20210374928; 20210374916; 20210366127; 20210365710; 20210358082; 20210343027; 20210338109; 20210334942; 20210334580; 20210334542; 20210322824; 20210327066;

11151390; 20210315486; 20210319213; 20210315485; 20210307621; 20210312229; 20210312321; 20210303894; 20210304487; 20210304418; 20210295483; 20210295019; 20210294424; 20210294585; 11126910; 20210287785; 11120255; 20210281774; 20210279456; 20210277564; 20210279486; 11114208; 20210272283; 20210267491; 20210248387; 11087514; 20210236053; 20210237778; 20210241352; 20210236032; 20210233234; 20210233213; 20210232407; 20210224590; 20210225069; 20210225002; 20210209793; 20210209808; 20210208289; 20210201124; 20210201456; 20210202090; 20210192771; 20210192783; 20210183022; 20210182612; 20210183430; 20210183212; 20210182545; 20210173916; 20210166058; 11024060; 20210158699; 20210158033; 20210158593; 20210158565; 20210152751; 20210142149; 20210142440; 20210132223; 20210133985; 20210125398; 20210121100; 20210117703; 20210118134; 20210103736; 20210097266; 20210097730; 20210090608; 20210089570; 20210090694; 20210078178; 20210081029; 20210081678; 20210073525; 20210074004; 20210065370; 20210065365; 20210059614; 20210059569; 20210059596; 20210065418; 20210057069; 20210058533; 20210049802; 20210034913; 20210031110; 20210035689; 10911775; 20210027484; 20210020360; 20210012064; 20210001174; 20210004589; 10885347; 20200410241; 20200412772; 20200401224; 20200402419; 20200397345; 20200394413; 20200387782; 20200388033; 10861144; 20200380292; 20200380659; 10853691; 20200356810; 20200356773; 10832045; 20200349382; 10826629; 20200342597; 20200342297; 20200337591; 20200342306; 20200329955; 20200334851; 20200335086; 20200327709; 20200309880; 20200311400; 10790056; 20200302181; 20200302184; 20200302635; 20200294248; 20200294294; 20200286273; 20200288186; 20200286208; 20200287949; 20200279102; 20200272779; 20200272864; 20200247420; 20200226787; 20200226788; 20200215434; 20200219262; 20200211154; 10699751; 20200202214; 20200193227; 20200193591; 20200193148; 20200193206; 20200175290; 20200160154; 20200151019; 20200151807; 20200151437; 20200134778; 20200126261; 20200126209; 10628688; 20200118000; 20200117952; 20200111341; 20200105014; 20200097070; 20200098175; 20200097732; 20200090484; 20200082635; 20200070840; 20200066029; 20200064827; 20200050923; 20200043086; 20200035362; 20200036528; 20200034668; 20200034785; 20200023842; 20200012876; 20190378242; 20190370537; 10489683; 20190347817; 20190347557; 10468142; 20190325269; 20190325219; 20190304157; 20190303682; 20190294871; 20190272375; 20190251702; 20190244059; 20190228587; 20190213470; 20190206054; 20190188876; 20190188533; 10321728; 10304208; 20190147582; 20190138850; 20190122424; 20190065900; 20190042743; 20180285699; 20180189642; 20180144209; 20180075581; 20180046894; 20180046903; 20170357891; 20170308756; 20170147905; and 20170148222.

Video Query

There are many efforts that use the Deep Neural Networks (DNNs) to make sense of video and present the labels for query purposes. Labels can be searched for in semi-real-time or they may be indexed for future references. A model can be used for video analysis to track objects using an edge system for a better understanding of urban intersections on how the cars and pedestrians behave. Similar approaches are suggested using DNN to summarize the video such as the street extraction, car detection, and path determination. Another example uses Natural Language Processing (NLP) techniques adopted with a CNN to give sentences of actions in video segments.

en.wikipedia.org/wiki/Deep_learning
en.wikipedia.org/wiki/Machine_learning
en.wikipedia.org/wiki/Artificial_neural_network
en.wikipedia.org/wiki/Convolutional_neural_network See, U.S. patent and patent application Nos. 20220057519; 11256242; 11257584; 20220048503; 11250376; 20220044558; 20220038902; 20220026557; 20220030382; 20220022029; 20220019948; 20220014963; 20220014423; 11222069; 20220005332; 20220005588; 11216498; 11216888; U.S. Pat. No. D9,399,805; 11217032; 20210409335; 20210406314; 20210400537; 20210398539; 20210390624; 11181911; 20210357648; 11176444; 20210338973; 11164312; 11163952; 20210326967; 20210319894; 20210302169; 20210302170; 20210302171; 20210304123; 20210287013; 20210287141; 20210280322; 20210271974; 11106944; 20210263779; 20210266346; 11094212; 11087882; 11082731; 20210233204; 20210210170; 20210200993; 20210201543; 20210191506; 11042779; 11037024; 20210173916; 11032017; 11029300; 11029685; 20210158561; 20210157312; 11019161; 11017575; 20210144517; 20210142904; 20210142885; 20210133461; 20210133492; 20210120255; 20210117760; 20210109971; 20210104326; 10970635; 10957171; 10956785; 20210081676; 10949773; 20210073449; 20210073252; 20210065703; 20210067549; 20210065063; 10936687; 20210056404; 20210042499; 20210042634; 20210042633; 20210041953; 20210042527; 10902049; 20210019528; 20210011961; 20210007607; 20210004962; 20200405148; 20200410335; 10848590; 20200365268; 10839694; 20200348662; 20200348132; 20200349729; 20200342290; 10817891; 20200334809; 20200329233; 20200327731; 10796402; 20200311468; 20200311072; 10789535; 20200302177; 10783998; 10776655; 20200285896; 20200285952; 20200279387; 20200279279; 20200268260; 10755810; 10755115; 10748038; 20200257943; 10742340; 20200251213; 20200245873; 10733292; 10719706; 20200226421; 20200228880; 20200225655; 20200218888; 10685244; 20200186751; 10679669; 10678846; 20200171671; 20200175384; 20200162354; 20200159778; 20200133257; 10637814; 10635981; 10621473; 20200103894; 20200104522; 10607463; 10606814; 20200097771; 20200086078; 20200097412; 20200073969; 20200074234; 20200073968; 20200057965; 20200053325; 20200027026; 20200012670; 20190392001; 20190392323; 20190370587; 10482900; 20190347518; 20190339688; 10459975; 20190324439; 20190325227; 20190325275; 20190325292; 20190324444; 20190313915; 20190317965; 20190318099; 20190311367; 10437884; 20190304157; 20190294889; 20190286086; 20190259033; 20190247662; 10380428; 20190244366; 10360357; 20190209022; 10346737; 20190201691; 10331124; 20190171438; 20190171885; 10297070; 20190130110; 20190121350; 20190102840; 10248664; 20190095716; 20190075149; 20190065908; 20190050942; 20190043201; 20190045207; 20190034716; 20180367484; 20180367483; 20180309795; 20180308569; 10106153; 20180293442; 20180284758; 10089330; 20180260414; 10042038; 20180189974; 20180165554; 20180083898; 20180075483; 20180001184; 20170367651; 20170249387; 20170193218; 20170185871; 20170173262; 20170154212; 20170103264; 20170099200; 20170076143; 20170011279; 20160379352; 20160378861; 20160350886; 20160350336; 20160350649; 20160187199; 20160104486; 20160019458; 20150339570; 9165064; 8928671; 20140300758; 20140294361; 8566928; 20110211036; 20100223276; 20100070448; 20070282765; 20070016563; 6961954; 6665489; 6453420; and 20020091991.

Researchers also introduced a method to compare video segments, available in a public data set MVS1K, where images searched by a query on the web are used as preferences for query intent. See, Ansuman Mahapatra, Pankaj K Sa, Banshidhar Majhi, and Sudarshan Padhy. 2016. MVS: A multi-view video synopsis framework. SPIC (2016).

More recently, the research community has turned its focus to deploy detection models to better search in the videos using query engines. After parsing an image, the engine looks at tables that are filled with the detection results from the video processing algorithms.

A distributed network has been proposed that is capable of accepting queries in both real-time and an indexed version for video analysis. Following these works, a distributed version of a query language for video search is investigated and the features for faster off-line analytical searches are indexed. D. Nagothu, R. Xu, S. Y. Nikouei, and Y. Chen, "A microservice-enabled architecture for smart surveillance using blockchain technology," in 2018 IEEE International Smart Cities Conference (ISC2). IEEE, 2018, pp. 1-4.

SUMMARY OF THE INVENTION

A first aspect of the disclosure provides a system including: a plurality of cameras, each camera of the plurality of cameras having a distinct geolocation; at least one computing device in electronic communication with each of the plurality of cameras, the at least one computing device identifying an object of interest in frames captured by at least one camera of the plurality of cameras by performing processes including: generating object data relating to at least one object included in a frame captured by each of the plurality of cameras; determining if the object of interest is included in any of the frames captured by each of the plurality of cameras based on the generated object data, the object of interest defined in a received query; identifying at least one matching frame captured by at least one camera of the plurality of cameras that includes the object of interest; and providing match data relating to at least one of: the at least one matching frame including the object of interest defined in the query, or the at least one camera of the plurality of cameras that captured the at least one matching frame including the object of interest defined in the query.

A second aspect of the disclosure provides a computer program product stored on a non-transitory computer-readable storage medium, which when executed by a computing system, identifies objects of interest in frames captured by at least one camera of a plurality of cameras, the computer program product including: generating object data relating to at least one object included in a frame captured by each of the plurality of cameras; determining if the object of interest is included in any of the frames captured by each of the plurality of cameras based on the generated object data, the object of interest defined in a received query; identifying at least one matching frame captured by at least one camera of the plurality of cameras that includes the object of interest; and providing match data relating to at least one of: the at least one matching frame including the object of interest defined in the query, or the at least one camera of the plurality of cameras that captured the at least one matching frame including the object of interest defined in the query.

A third aspect of the disclosure provides a method for identifying objects of interest in frames captured by at least one camera of a plurality of cameras, the method including: generating object data relating to at least one object included in a frame captured by each of the plurality of cameras; determining if the object of interest is included in any of the frames captured by each of the plurality of cameras based on the generated object data, the object of interest defined in a received query; identifying at least one matching frame captured by at least one camera of the plurality of cameras that includes the object of interest; and providing match data relating to at least one of: the at least one matching frame including the object of interest defined in the query, or the at least one camera of the plurality of cameras that captured the at least one matching frame including the object of interest defined in the query.

A fourth aspect of the disclosure provides a method for querying data obtained from a distributed sensor network, comprising: receiving data from an environment with a sensor of the distributed sensor network; processing the received data in an automated processor proximate to the sensor to extract features; communicating the extracted features from the automated processor to a fog node through an automated communication network; computing characteristics of the extracted features by the fog node; determining, by the fog node, a correspondence of a received query to the computed characteristics; and communicating the received data having the computed characteristics corresponding to the query in response to the query.

A fifth aspect of the disclosure provides a fog node for a distributed sensor network, comprising: a communication port configured to communicate with an automated communication network; a memory; and at least one automated processor, configured to: control the communication port to receive a communication representing feature data from a sensor node; determine characteristics of the feature data using at least one of machine learning and statistical inference; storing the feature data in the memory; receive a query through the communication port; determine a correspondence of the query to the characteristics; and releasing data from the sensor node selectively in dependence on the correspondence of the query to the characteristics.

A sixth aspect of the disclosure provides a method for querying data obtained from a distributed sensor network, comprising: receiving sensor data representing an aspect of an environment with a sensor of the distributed sensor network; communicating a representation of the sensor data to a fog node through an automated communication network; determining, by the fog node, a correspondence of a query received through the automated communication network to characteristics of the representation of the sensor data; and selectively communicating, in response to the query, at least one of: the sensor data having the determined characteristics corresponding to the query, an identification of the sensor data having the determined characteristics corresponding to the query, and the data representing the sensor data having the determined characteristics corresponding to the query.

The sensor of the distributed sensor network may comprise a video surveillance camera configured to generate a stream of video images as the sensor data, having an associated automated processor configured to extract features of the stream of video images as the representation of the sensor data; and the query may comprise at least one of a movement, a color, a size and a shape morphology of an object.

The query may comprise a semantic query, the sensor data comprises surveillance video, the representation of the sensor data comprises extracted features of the surveillance video, and the characteristics of the representation of the sensor data comprise a color.

The fog node may comprise a deep neural network trained on a semantic space of the query with respect to characteristics of the representation of the sensor data.

The fog node may comprise a statistical inference model relating a semantic space of the query with characteristics of the representation of the sensor data.

The query may describe clothing of a person.

A seventh aspect of the disclosure provides an intermediate node for a distributed sensor network, comprising: a communication port configured to communicate with an automated communication network; a memory; and at least one automated processor, configured to: control the communication port to receive a communication representing data from a sensor node; determine characteristics of the data using at least one of machine learning and statistical inference; storing the feature data in the memory; receive a query through the communication port; determine a correspondence of the query to the characteristics; and releasing data from the sensor node selectively in dependence on the correspondence of the query to the characteristics.

The node may further comprise a sensor node comprising: a video surveillance camera configured to generate a stream of video images as the sensor data; and an automated processor configured to extract features of the stream of video images; and transmit the communication representing data from the sensor node.

The query may comprise at least one of a movement, a color, a size, and a shape morphology of an object.

The query comprise a semantic query. The communication representing data from the sensor node may comprise surveillance video. The characteristics of the sensor data may comprise a color.

The node may comprise a deep neural network trained on a semantic space of the query with respect to characteristics of the representation of the data.

The node may comprise a statistical inference model relating a semantic space of the query with characteristics of the representation of the sensor data.

The query may describe clothing of a person.

An eighth fourth aspect of the disclosure provides a system comprising: a plurality of cameras, each camera of the plurality of cameras having a distinct geolocation; at least one computing device in electronic communication with each of the plurality of cameras, the at least one computing device being configured to determine whether an object of interest is present in frames captured by at least one camera of the plurality of cameras by performing a process comprising: generating object data relating to at least one object included in a frame captured by each of the plurality of cameras; receiving a query describing an object of interest; determining if the object of interest is included in any of the frames captured by each of the plurality of cameras based on the generated object data; identifying at least one matching frame captured by at least one camera of the plurality of cameras that includes the object of interest; and providing match data relating to at least one of: the at least one matching frame including the object of interest defined in the query, or the at least one camera of the plurality of cameras that captured the at least one matching frame including the object of interest defined in the query.

The at least one computing device may be configured to: generate object data relating to at least one object included in a frame captured by each of the plurality of cameras; receive a query describing an object of interest; determine if the object of interest is included in any of the frames captured by each of the plurality of cameras based on the generated object data; identify at least one matching frame captured by at least one camera of the plurality of cameras that includes the object of interest; and provide match data relating to at least one of: the at least one matching frame including the object of interest defined in the query, or the at least one camera of the plurality of cameras that captured the at least one matching frame including the object of interest defined in the query.

The provided match data relating to the at least one matching frame may include at least one of: a frame time in which the object of interest is included in the at least one matching frame, a visual depiction of the object of interest included in the at least one matching frame, or information relating to the object of interest based on the generated object data;

The provided match data related to the at least one camera of the plurality of cameras that captured the at least one matching frame may include at least one of: a camera ID associated with the at least one camera, or a geolocation of the at least one camera.

The received query may define the object of interest by at least one of: identifying the object of interest as one of an inanimate object, an animal, or a person, specifying feature characteristics of the object of interest, or providing keywords describing the object of interest.

The feature characteristics of the object may comprise at least one of a gender, a movement, and a color.

The at least one computing device may generate the object data relating to at least one object included in the frame captured by each of the plurality of cameras by generating keypoint data based on humans detected in the frame captured by each of the plurality of cameras.

The at least one computing device may generate the object data relating to at least one object included in the frame captured by each of the plurality of cameras by further generating a confidence score for at least one of a body-joint of the humans predicted using the keypoint data and a part affinity fields for parts association using the keypoint data.

The at least one computing device may comprise: a first plurality of edge nodes, each of the first plurality of edge nodes associated with and in direct communication with one camera of the plurality cameras; a first fog node associated with and in direct communication with each of the first plurality of edge nodes; and a cloud node in communication with the first fog node, wherein the query is received by the first fog node from the cloud node, and the cloud node is isolated from the frames captured by at least one camera of the plurality of cameras unless the frames comprise the object of interest.

The at least one computing device may further comprise: a second plurality of edge nodes, distinct from the first plurality of edge nodes, each of the second plurality of edge nodes associated with and in direct communication with one camera of a distinct plurality cameras; and a second fog node associated with and in direct communication with each of the second plurality of edge nodes, wherein the distinct plurality of cameras are distinct from the plurality of cameras, and wherein the query is received by the second fog node from the cloud node, and the cloud node is isolated from the frames captured by at least one camera of the distinct plurality of cameras unless the frames comprise the object of interest.

Because of the tight constraints on time delays and communication network bandwidth, it is not practical to outsource the huge amount of raw video streams to a cloud center to instantly process the queries. Instead, edge computing is a promising solution. Edge computing allows computational tasks conducted by smart Internet of Things (IoT) devices on-site or near-site, which enables instant information procession and decision-making. In addition, the novel microservices architecture, a variant of the service-oriented architecture (SOA) structural style, supports the development of lightweight applications for the edge environment as a collection of loosely coupled, fine-grained applications.

The non-limiting examples discussed herein may encompass an Interactive Video Surveillance as an Edge service (I-ViSE) based on unsupervised queries, which allows the operator to search by keywords and feature descriptions. The I-ViSE system matches query searches with captured video frames where the objects of interest appear. The I-ViSE search platform gives the option to utilize a set of microservices to look for features in a mathematical model such as objects, people, color, and behaviors. Adopting unsupervised classification methods, the I-ViSE scheme works with the general features such as a human body and color of clothes, while not violating the privacy of residents being monitored. The I-ViSE is built following the edge-fog computing paradigm and the experimental results verify the I-ViSE scheme meets the real-time requirements. See, Marín-Tordera, Eva, Xavi Masip-Bruin, Jordi Garcia-Alminñana, Admela Jukan, Guang-Jie Ren, and Jiafeng Zhu. "Do we all really know what a fog node is? Current trends towards an open definition." Computer Communications 109 (2017): 117-130.

Tordera, Eva Marín, Xavi Masip-Bruin, Jordi Garcia-Alminana, Admela Jukan, Guang-Jie Ren, Jiafeng Zhu, and Josep Farré. "What is a fog node a tutorial on current concepts towards a common definition." arXiv preprint arXiv:1611.09193 (2016).

Xiao, Yong, and Marwan Krunz. "QoE and power efficiency tradeoff for fog computing networks with fog node cooperation." In IEEE INFOCOM 2017-IEEE Conference on Computer Communications, pp. 1-9. IEEE, 2017.

Sharma, Pradip Kumar, Mu-Yen Chen, and Jong Hyuk Park. "A software defined fog node based distributed blockchain cloud architecture for IoT." Ieee Access 6 (2017): 115-124.

Marin Tordera, Eva, Xavi Masip-Bruin, Jordi Garcia-Alminana, Admela Jukan, Guang-Jie Ren, Jiafeng Zhu, and Josep Farre. "What is a fog node A tutorial on current concepts towards a common definition." arXiv e-prints (2016): arXiv-1611.

Yi, Shanhe, Zijiang Hao, Zhengrui Qin, and Qun Li. "Fog computing: Platform and applications." In 2015 Third IEEE workshop on hot topics in web systems and technologies (HotWeb), pp. 73-78. IEEE, 2015.

Cirani, Simone, Gianluigi Ferrari, Nicola Iotti, and Marco Picone. "The IoT hub: A fog node for seamless management of heterogeneous connected smart objects." In 2015 12th Annual IEEE International Conference on Sensing, Communication, and Networking-Workshops (SECON Workshops), pp. 1-6. IEEE, 2015.

Aslam, Mudassar, Bushra Mohsin, Abdul Nasir, and Shahid Raza. "FoNAC—an automated fog node audit and certification scheme." Computers & Security 93 (2020): 101759.

Yi, Shanhe, Cheng Li, and Qun Li. "A survey of fog computing: concepts, applications and issues." In Proceedings of the 2015 workshop on mobile big data, pp. 37-42. 2015.

Karagiannis, Vasileios. "Compute node communication in the fog: Survey and research challenges." In Proceedings of the Workshop on Fog Computing and the IoT, pp. 36-40. 2019.

Abedin, Sarder Fakhrul, Md Golam Rabiul Alam, Nguyen H. Tran, and Choong Seon Hong. "A Fog based system model for cooperative IoT node pairing using matching theory." In 2015 17th Asia-Pacific Network Operations and Management Symposium (APNOMS), pp. 309-314. IEEE, 2015.

Prakash, P., K. G. Darshaun, P. Yaazhlene, Medidhi Venkata Ganesh, and B. Vasudha. "Fog computing: issues, challenges and future directions." International Journal of Electrical and Computer Engineering 7, no. 6 (2017): 3669.

Kim, Nam Yong, Jung Hyun Ryu, Byoung Wook Kwon, Yi Pan, and Jong Hyuk Park. "CF-CloudOrch: container fog node-based cloud orchestration for IoT networks." The Journal of Supercomputing 74, no. 12 (2018): 7024-7045.

Oma, Ryuji, Shigenari Nakamura, Dilawaer Duolikun, Tomoya Enokido, and Makoto Takizawa. "A fault-tolerant tree-based fog computing model." International Journal of Web and Grid Services 15, no. 3 (2019): 219-239.

Maan, Ujjawal, and Yogesh Chaba. "Deep Q-network based fog node offloading strategy for 5 G vehicular Adhoc Network." Ad Hoc Networks 120 (2021): 102565.

Naik, K. Jairam. "A co-scheduling system for fog-node recommendation and load management in cloud-fog environment (CoS_FRLM)." In 2020 International Conference on Data Analytics for Business and Industry: Way Towards a Sustainable Economy (ICDABI), pp. 1-6. IEEE, 2020.

Qayyum, Tariq, Asad Waqar Malik, Muazzam A. Khan Khattak, Osman Khalid, and Samee U. Khan. "FogNetSim++: A toolkit for modeling and simulation of distributed fog environment." IEEE Access 6 (2018): 63570-63583.

Guo, Yinzhe, Ryuji Oma, Shigenari Nakamura, Dilawaer Duolikun, Tomoya Enokido, and Makoto Takizawa. "Evaluation of a two-way tree-based fog computing (TWTBFC) model." In International Conference on Innovative Mobile and Internet Services in Ubiquitous Computing, pp. 72-81. Springer, Cham, 2019.

Phan, Linh-An, Duc-Thang Nguyen, Meonghun Lee, Dae-Heon Park, and Taehong Kim. "Dynamic fog-to-fog offloading in SDN-based fog computing systems." Future Generation Computer Systems 117 (2021): 486-497.

Yi, Shanhe, Zhengrui Qin, and Qun Li. "Security and privacy issues of fog computing: A survey." In International conference on wireless algorithms, systems, and applications, pp. 685-695. Springer, Cham, 2015.

Lyu, Lingjuan, Karthik Nandakumar, Ben Rubinstein, Jiong Jin, Justin Bedo, and Marimuthu Palaniswami. "PPFA: Privacy preserving fog-enabled aggregation in smart grid." IEEE Transactions on Industrial Informatics 14, no. 8 (2018): 3733-3744.

Zhang, Guowei, Fei Shen, Yang Yang, Hua Qian, and Wei Yao. "Fair task offloading among fog nodes in fog computing networks." In 2018 IEEE international conference on communications (ICC), pp. 1-6. IEEE, 2018.

Hong, Kirak, David Lillethun, Umakishore Ramachandran, Beate Ottenwälder, and Boris Koldehofe. "Mobile fog: A programming model for large-scale applications on the internet of things." In Proceedings of the second ACM SIGCOMM workshop on Mobile cloud computing, pp. 15-20. 2013.

U.S. patent and patent application Nos. 20220066901; 20220070114; 20220070699; 20220050726; 20220049867; 20220014932; 20220007163; 20210406770; 20210406081; 20210409482; 20210392055; 11201789; 20210374123; 20210350220; 20210349799; 20210352472; 20210345451;

20210336862; 20210319081; 20210314187; 20210314811; 20210312324; 20210297429; 20210286655; 20210281657; 20210279235; 20210271984; 20210273918; 20210256401; 20210226866; 20210217182; 20210208946; 20210201538; 20210203992; 20210204151; 20210186796; 20210194851; 20210192768; 11044149; 20210184945; 20210185600; 20210176146; 20210144198; 20210142210; 11005857; 20210135890; 20210133559; 10993284; 20210117758; 20210120088; 20210119933; 20210117860; 20210105435; 20210099848; 20210092202; 10959290; 20210076180; 20210076378; 20210075767; 20210067605; 10932195; 20210045034; 20210044678; 10904805; 20210021510; 20210014113; 10893575; 20210007014; 10887808; 10887851; 20200401157; 10868754; 20200389410; 20200386846; 20200386857; 20200388134; 20200379548; 20200374677; 20200374216; 20200371893; 10848988; 20200365008; 20200366585; 20200366737; 20200356086; 20200359317; 20200359285; 20200359312; 20200351537; 10826705; 20200336536; 20200326981; 20200328977; 20200322764; 20200322809; 20200322437; 10797805; 20200314614; 20200304568; 20200296187; 20200296856; 20200293942; 20200296169; 20200296779; 10779246; 20200287737; 20200288374; 20200282857; 20200285523; 20200274942; 20200272859; 20200275426; 20200274773; 20200267518; 20200267543; 20200267520; 20200259660; 20200257275; 20200252296; 10735924; 20200244576; 20200233472; 20200235949; 20200228948; 20200228439; 20200229246; 20200228880; 20200227178; 20200225724; 20200218767; 20200219007; 20200204638; 10691570; 20200195495; 20200171969; 20200177485; 20200162199; 20200162503; 20200153515; 20200128591; 20200125529; 20200127899; 20200107168; 20200095074; 20200092255; 20200092396; 20200076815; 20200076926; 20200076715; 20200077425; 20200076682; 20200074862; 10581972; 20200067926; 20200044918; 20200036779; 20200036796; 20200023797; 20200027333; 20200021502; 20200014763; 20200007414; 20200008044; 20190394812; 20190394096; 20190394124; 20190381891; 20190379616; 20190380171; 20190377592; 20190366558; 20190372973; 20190364110; 20190349433; 20190349392; 20190342011; 20190327506; 20190325060; 20190327486; 20190320040; 20190317818; 20190320494; 20190319793; 20190308520; 20190312898; 20190302221; 20190304630; 20190306233; 20190297101; 20190297063; 20190289022; 20190288913; 20190281725; 20190280996; 20190281132; 20190272011; 20190253319; 20190253477; 20190245806; 20190243685; 20190238510; 20190226854; 20190229897; 20190228166; 20190230191; 20190230154; 20190227949; 20190230002; 20190226868; 20190227843; 20190229990; 20190218153; 20190220321; 20190220210; 20190222518; 20190215704; 20190215378; 20190215838; 10348481; 20190202304; 20190196879; 20190197146; 20190190789; 20190171494; 20190173761; 20190173762; 20190163530; 20190164087; 20190163548; 20190158606; 20190158300; 20190155636; 20190147070; 20190138534; 20190138294; 20190138361; 20190141120; 20190141142; 20190141540; 20190141610; 20190138356; 20190138908; 20190141119; 20190141593; 20190140919; 20190140933; 20190141121; 20190141536; 20190132269; 20190132190; 20190132206; 20190124156; 20190122121; 20190123984; 20190116124; 20190114247; 20190114080; 20190114337; 20190116241; 10262019; 20190104437; 20190089467; 20190089651; 20190079898; 20190080178; 20190079788; 20190053074; 20190044740; 20190044918; 20190044894; 20190042228; 20190043201; 20190044818; 20190044878; 20190045033; 20190044852; 20190045207; 20190039471; 20190039463; 20190039470; 20190034716; 20190036841; 20190036873; 20190037639; 20190028552; 20190013996; 20180373807; 20180368053; 20180367595; 20180349247; 20180349857; 20180330293; 20180332053; 20180332434; 20180331885; 20180321356; 20180316628; 20180316655; 20180316555; 20180316725; 20180313558; 20180315258; 20180316563; 20180316673; 20180316681; 20180317100; 20180309662; 20180309821; 20180307714; 20180310232; 20180299864; 20180295016; 20180293869; 20180295066; 20180288774; 20180276049; 20180270121; 10075232; 20180254997; 20180198641; 20180183660; 20180159745; 20180152909; 9986509; 20180123887; 20180123963; 20180124646; 20180124688; 20180124632; 20180109428; 20180102985; 20180067779; 20180063020; 20180063261; 20180014486; 20180020062; 20170374082; 20170366472; 20170366513; 20170339099; 20170339190; 20170324849; 20170300693; 20170302663; 20170295109; 20170288988; 20170277173; 20170264440; 20170252256; 20170244601; 9703650; 20170126647; 20170116526; 20170048308; 20160359664; 20160357523; 20160357521; 20160357522; 20160357525; 20160357524; 20160265224; 20160142868; 20160037613; 20150317835; 20150249586; 20150221221; 20150213056; 20150078333; 20090271715; US 20220058012; 20220051261; 20220050722; 11252655; 11250069; 20220046072; 11243516; 20220036302; 20220038902; 20220038554; 20220029886; 20220022066; 20220021538; 20220014963; 20220012095; 11223646; 11216752; 20210409335; 20210406977; 20210390002; 20210382731; 20210385865; 20210374530; 20210367829; 20210357509; 20210358032; 20210352139; 20210352099; 11171845; 20210342836; 20210334797; 20210326221; 20210326237; 20210326365; 20210311798; 20210279825; 20210274412; 20210271882; 20210266303; 20210255847; 20210248514; 11089051; 20210232200; 20210224174; 11068328; 11057271; 20210204164; 20210182996; 20210185142; 11036474; 20210157312; 20210149723; 20210144517; 11003486; 11003434; 11003423; 20210133670; 20210135983; 20210132935; 10992780; 20210109775; 10972503; 10970067; 20210089291; 20210092583; 20210084446; 20210081287; 10951606; 10949198; 20210073449; 20210064360; 10936224; 20210042160; 20210042280; 20210027136; 20210028991; 20200409673; 20200394183; 20200379970; 10853154; 20200358802; 20200348662; 20200351650; 20200351077; 10827329; 20200344290; 20200341971; 20200342456; 10789553; 20200302066; 20200301898; 20200294128; 20200294133; 10776099; 20200285451; 10768923; 10771524; 10762285; 10764244; 20200257680; 20200244652; 20200236162; 20200226473; 20200195528; 20200183749; 20200184556; 20200186243; 20200151291; 20200143246; 10642715; 20200125531; 20200120122; 10621001; 20200112490; 20200099764; 20200097670; 20200081841; 20200067789; 20200043008; 20200044934; 20200042365; 20200036796; 20190392002; 20190362101; 20190347168; 10476936; 20190340059; 20190340379; 10467045; 20190332795; 20190334779; 20190327135; 20190327297; 20190312792; 10440114; 10430511; 20190297150; 10417043; 20190273746; 20190213326; 20190171438; 20190166162; 20190130114; 20190098106; 20190089651; 10235105; 10172043; 20180367612; 20180324204; 20180324173; 20180270107; 20180238575; 20180131769; 20180069925; 20180036591; and 20160345176.

Architecture of I-ViSE

I-ViSE uses video queries for smart urban surveillance. The first step toward understanding of the video data begins with object detection and classification of images (e.g., pictures). Visual data querying uses deep learning models to classify specific objects in frames with bounding boxes. For example, the I-ViSE enables security officers to conduct real-time search in a large-scale smart surveillance system based on high-level, not-so-accurate descriptions on the object of interest. For instance, the phrases like "red hat, blue jeans" are normally applied as the keys and the I-ViSE system returns the matches with geolocation associated with the cameras.

The I-ViSE system is built on a layered architecture that follows the edge-fog-cloud computing paradigm. At the edge, smart cameras are deployed to collect video streams and conduct pre-processing for object detection and feature extraction. Due to constrained computing capability at this stage, more complex tasks are deployed on the fog layer. Each fog node communicates and manages several edge devices. Normally, fog nodes that are close to the geolocation of the associated edge nodes are allocated. Meanwhile, fog nodes communicate with the cloud node, accepting dispatched queries.

Due to the attractive features of low cost, small energy consumption, and reasonable computing power; the edge nodes of the I-ViSE system may be smart cameras built with the Single Board Computers (SBC), such as Raspberry Pi Model 3 or Model 4. With a good tradeoff between the computing power and energy utility, the edge nodes accommodate microservices that execute video pre-processing and feature extracting tasks. Meanwhile, the fog nodes are expected to be capable of maintaining the throughput required as a middle node. The Fog node may be, for example, a tablet or a laptop that is deployed close to the locations of the smart cameras. For instance, the laptop carried on the patrolling vehicle driven by a security officer. The cloud center has a connection to all of the edge and fog nodes in the network and can access any device when needed. Human operators can issue queries to all the fog nodes from the cloud center.

Therefore, the fog nodes may precompute characteristics of the images or other data, and store the characteristics in a data structure. Typically, the fog nodes are not equipped with essentially infinite storage, and therefore older portions of the live stream data are deleted. In some cases, the live stream may be passed to a centralized, decentralized, or cloud storage system, though the communication burden may be unsustainable, and therefore only limited streaming of raw data is preferably employed. Thus, the fog nodes are responsible for extracting information from the data.

More specifically, the microservices architecture is preferably realized through docker image implementation. The docker system is easy to use and it's availability through the cloud connection supports convenient interaction, efficient fetching, and pre-built image processing. Two docker container images are built for the I-ViSE platform, one for the edge nodes and the other for the fog nodes, each running a web service through the Python's Flask web-framework.

In the search algorithm, an edge hierarchy is adopted to connect a huge number of cameras into a tree-based graph to fog nodes, which are in charge of the request handling. The model has several advantages such as good scalability and easy updates and management when needed. This flexible platform architecture can easily handle more cameras when more edge and fog nodes are added.

Once a video frame is captured by the camera, it is streamed to the SBC on-site in the edge node. Alternately, the processor for the camera is the SBC, or itself performs the on-site processing. The SBC accepts every frame from the camera and marks it for either omitting or processing. Different levels of processing of the frame may also be supported, and the decision for type or amount of processing may be adaptive to a content of the frame.

On receiving a query from the fog or cloud layer, the edge device may commence processing the current video frames, and in particular, commence processing of the frames to generate a response to the query, if the information is not already available. According to the keywords or other criteria provided in the query, the edge node will detect whether or not there is an object of interest in the frames. If the object is detected, the key points of the human body and the corresponding colors in the key regions are extracted and sent to the fog node. The query-matching is conducted at the fog node as the edge device cannot handle the computing-intensive task. If there is a match, the fog node reports the results to the operator, including the frame time, the camera ID, and the location. The query may be a semantic query, or represent other classification or characterization of data.

When seeking to perform semantic or near-semantic searching of sensor data, such as images, various techniques, such as query by image content (QBIC) may be employed. Typically, the image data is processed to label features with semantic variables. This can be assisted with latent semantic indexing, especially where training data is natural language text or speech. The sensor data is typically preprocessed to segment the image into object boundaries, and extract a range of features or characteristics, and also higher-level combinations thereof. The sensor data may also be directly processed. The features or characteristics, objects, or images are then processed in a supervised, semisupervised, or unsupervised manner, to associate the range of the semantic space with the image, objects, or features or characteristics. The technology may be a statistical algorithm or a neural network algorithm, for example. See:
en.wikipedia.org/wiki/Content-based_image_retrieval
en.wikipedia.org/wiki/Concept-based_image_indexing
en.wikipedia.org/wiki/Query_by_Example
en.wikipedia.org/wiki/Relevance_feedback
en.wikipedia.org/wiki/Latent_semantic_analysis
en.wikipedia.org/wiki/Natural_language_processing
en.wikipedia.org/wiki/Distributional_semantics
en.wikipedia.org/wiki/Singular_value_decomposition
en.wikipedia.org/wiki/Principal_component_analysis
Praks, Pavel, Jiri Dvorský, and Václav Snášel. "Latent semantic indexing for image retrieval systems." In SIAM Linear Algebra Proceedings, Philadelphia, USA. International Linear Algebra Society (ILAS), http://www.siam.org/meetings/la03/proceedings/-Dvorsky.pdf. 2003.
Mejdoub, Mahmoud, Leonardo Fonteles, Chokri BenAmar, and Marc Antonini. "Embedded lattices tree: An efficient indexing scheme for content based retrieval on image databases." Journal of Visual Communication and Image Representation 20, no. 2 (2009): 145-156.
Wilkins, Peter, Daragh Byrne, G. Jones, Hyowon Lee, Gordon Keenan, Kevin McGuinness, N. O'connor et al. "K-space at trecvid 2008." (2008): 260-269.
Praks, Pavel, V. Snasel, J. Dvorsky, and J. Cernohorsky. "On SVD-free Latent Semantic Indexing for Image Retrieval for application in a hard industrial environment." In IEEE International Conference on Industrial Technology, 2003, vol. 1, pp. 466-471. IEEE, 2003.
Poslad, Stefan, and Kraisak Kesorn. "A Multi-Modal Incompleteness Ontology model (MMIO) to enhance information fusion for image retrieval." Information Fusion 20 (2014): 225-241.
Praks, Pavel, Radek Kucera, and Ebroul Izquierdo. "The sparse image representation for automated image retrieval." In 2008 15th IEEE International Conference on Image Processing, pp. 25-28. IEEE, 2008.

Stathopoulos, Spyridon, and Theodore Kalamboukis. "Applying latent semantic analysis to large-scale medical image databases." Computerized Medical Imaging and Graphics 39 (2015): 27-34.

Bae, Soo Hyun, and Biing-Hwang Juang. "IPSILON: incremental parsing for semantic indexing of latent concepts." IEEE transactions on image processing 19, no. 7 (2010): 1933-1947.

Koisnov, Serhiy, and Stéphane Marchand-Maillet. "Hierarchical ensemble learning for multimedia categorization and autoannotation." In Proceedings of the 2004 14th IEEE Signal Processing Society Workshop Machine Learning for Signal Processing, 2004, pp. 645-654. IEEE, 2004.

Kesorn, Kraisak. "Multi modal multi-semantic image retrieval." PhD diss., 2010.

Skopal, Tomáš. "Metric Indexing in Information Retrieval." Dizertační práce, VŠB—Technická univerzita Ostrava (2004).

Kosinov, Serhiy, and Stéphane Marchand-Maillet. "Overview of approaches to semantic augmentation of multimedia databases for efficient access and content retrieval." In International Workshop on Adaptive Multimedia Retrieval, pp. 19-35. Springer, Berlin, Heidelberg, 2003.

Rajendran, Priya, and T. N. Shanmugam. "A content-based video retrieval system: video retrieval with extensive features." International Journal of Multimedia Intelligence and Security 2, no. 2 (2011): 146-171.

Lew, Michael S., Nicu Sebe, Chabane Djeraba, and Ramesh Jain. "Content-based multimedia information retrieval: State of the art and challenges." ACM Transactions on Multimedia Computing, Communications, and Applications (TOMM) 2, no. 1 (2006): 1-19.

Eakins, John; Graham, Margaret. "Content-based Image Retrieval". University of Northumbria at Newcastle.

Kato, Toshikazu (April 1992). "Database architecture for content-based image retrieval". Image Storage and Retrieval Systems. International Society for Optics and Photonics. 1662: 112-123. Bibcode: 1992SPIE.1662.112K. doi:10.1117/12.58497. S2CID 14342247.

Flickner, M.; Sawhney, H.; Niblack, W.; Ashley, J.; Qian Huang; Dom, B.; Gorkani, M.; Hafner, J.; Lee, D.; Petkovic, D.; Steele, D.; Yanker, P. (1995). "Query by image and video content: the QBIC system". Computer. 28 (9): 23-32. doi:10.1109/2.410146.

Rui, Yong; Huang, Thomas S.; Chang, Shih-Fu (1999). "Image Retrieval: Current Techniques, Promising Directions, and Open Issues". Journal of Visual Communication and Image Representation. 10: 39-62. CiteSeerX 10.1.1.32.7819. doi:10.1006/jvci.1999.0413.

Banerjee, S. J.; et al. (2015). "Using complex networks towards information retrieval and diagnostics in multidimensional imaging". Scientific Reports. 5: 17271. arXiv: 1506.02602. Bibcode:2015NatSR . . . 517271B. doi: 10.1038/srep17271. PMC 4667282. PMID 26626047.

"Query-by-Example". IBM.com KnowledgeCenter. QBE is a language for querying . . . .

Shapiro, Linda; George Stockman (2001). Computer Vision. Upper Saddle River, NJ: Prentice Hall. ISBN 978-0-13-030796-5.

Datta, Ritendra; Dhiraj Joshi; Jia Li; James Z. Wang (2008). "Image Retrieval: Ideas, Influences, and Trends of the New Age". ACM Computing Surveys. 40 (2): 1-60. doi:10.1145/1348246.1348248. S2CID 7060187.

Bird, C. L.; P. J. Elliott; E. Griffiths (1996). "User interfaces for content-based image retrieval". IEE Colloquium on Intelligent Image Databases. IET. doi:10.1049/ic: 19960746.

Cardoso, Douglas; et al. "Iterative Technique for Content-Based Image Retrieval using Multiple SVM Ensembles" (PDF). Federal University of Parana (Brazil). Retrieved 2014-03-11.

Liam M. Mayron. "Image Retrieval Using Visual Attention" (PDF). Mayron.net. Retrieved 2012-10-18.

Eidenberger, Horst (2011). "Fundamental Media Understanding", atpress. ISBN 978-3-8423-7917-6.

Tamura, Hideyuki; Mori, Shunji; Yamawaki, Takashi (1978). "Textural Features Corresponding to Visual Perception". IEEE Transactions on Systems, Man and Cybernetics. 8 (6): 460, 473. doi:10.1109/tsmc.1978.4309999. S2CID 32197839.

Tushabe, F.; M. H. F. Wilkinson (2008). Content-based Image Retrieval Using Combined 2D Attribute Pattern Spectra (PDF). Lecture Notes in Computer Science. Vol. 5152. pp. 554-561. doi:10.1007/978-3-540-85760-0-69. ISBN 978-3-540-85759-4.

Zhou, Mo; Niu, Zhenxing; Wang, Le; Zhang, Qilin; Hua, Gang (2020). "Adversarial Ranking Attack and Defense". arXiv:2002.11293v2.

Li, Jie; Ji, Rongrong; Liu, Hong; Hong, Xiaopeng; Gao, Yue; Tian, Qi (2019). "Universal Perturbation Attack Against Image Retrieval". pp. 4899-4908. arXiv: 1812.00552.

Madry, Aleksander; Makelov, Aleksandar; Schmidt, Ludwig; Tsipras, Dimitris; Vladu, Adrian (2017-06-19). "Towards Deep Learning Models Resistant to Adversarial Attacks". arXiv:1706.06083v4.

Deselaers, Thomas; Keysers, Daniel; Ney, Hermann (2007). "Features for Image Retrieval: An Experimental Comparison" (PDF). RWTH Aachen University.

Bhattacharjee, Pijush Kanti (2010). "Integrating Pixel Cluster Indexing, Histogram Intersection and Discrete Wavelet Transform Methods for Color Images Content Based Image Retrieval System" (PDF). International Journal of Computer and Electrical Engineering [IJCEE], Singapore, vol. 2, no. 2, pp. 345-352, 2010.

Wang, James Ze; Jia Li; Gio Wiederhold; Oscar Firschein (1998). "System for Screening Objectionable Images". Computer Communications. 21 (15): 1355-1360. CiteSeerX 10.1.1.78.7689. doi:10.1016/s0140-3664(98)00203-5.

Query by Image and Video Content: The QBIC System, (Flickner, 1995)

Fleck, Margaret M., David A. Forsyth, and Chris Bregler. "Finding naked people." In European conference on computer vision, pp. 593-602. Springer, Berlin, Heidelberg, 1996.

Hampapur, Arun, Amarnath Gupta, Bradley Horowitz, Chiao-Fe Shu, Charles Fuller, Jeffrey R. Bach, Monika Gorkani, and Ramesh C. Jain. "Virage video engine." In Storage and retrieval for image and video databases V, vol. 3022, pp. 188-198. SPIE, 1997.

Vasconcelos, Nuno, and Andrew Lippman. "Library-based coding: A representation for efficient video compression and retrieval." In Proceedings DCC'97. Data Compression Conference, pp. 121-130. IEEE, 1997.

Wang, James Ze, Jia Li, Gio Wiederhold, and Oscar Firschein. "System for screening objectionable images." Computer Communications 21, no. 15 (1998): 1355-1360.

Eakins, J., and M. E. Graham, "Content-based Image Retrieval" (JISC Technology Applications Programme Report 39) (1999).

Ardizzoni, Stefania, Ilaria Bartolini, and Marco Patella. "Windsurf: Region-based image retrieval using wavelets." In Proceedings. Tenth International Workshop on Database and Expert Systems Applications. DEXA 99, pp. 167-173. IEEE, 1999.

Vasconcelos, Nuno, and Andrew Lippman. "A probabilistic architecture for content-based image retrieval." In Proceedings IEEE Conference on Computer Vision and Pattern Recognition. CVPR 2000 (Cat. No. PR00662), vol. 1, pp. 216-221. IEEE, 2000.

Vasconcelos, Nuno, and Andrew Lippman. "A unifying view of image similarity." In Proceedings 15th International Conference on Pattern Recognition. ICPR-2000, vol. 1, pp. 38-41. IEEE, 2000.

Lew, Michael S. "Next-generation web searches for visual content." Computer 33, no. 11 (2000): 46-53.

Vasconcelos, Nuno. "Image indexing with mixture hierarchies." In CVPR (1), pp. 3-10. 2001.

Wang, James Ze, Jia Li, and Gio Wiederhold. "SIMPLIcity: Semantics-sensitive integrated matching for picture libraries." IEEE Transactions on pattern analysis and machine intelligence 23, no. 9 (2001): 947-963.

Popescu, Adrian, and Gregory Grefenstette. "A Conceptual Approach to Web Image Retrieval." In Proceedings of the Sixth International Conference on Language Resources and Evaluation (LREC'08). 2008.

Ruiz-del-Solar, Javier, and Pablo Navarrete. "FACERET: An interactive face retrieval system based on self-organizing maps." In International Conference on Image and Video Retrieval, pp. 157-164. Springer, Berlin, Heidelberg, 2002.

Li, Jia, and James Ze Wang. "Automatic linguistic indexing of pictures by a statistical modeling approach." IEEE Transactions on pattern analysis and machine intelligence 25, no. 9 (2003): 1075-1088.

Sivic, Josef, and Andrew Zisserman. "Video Google: A text retrieval approach to object matching in videos." In Computer Vision, IEEE International Conference on, vol. 3, pp. 1470-1470. IEEE Computer Society, 2003.

Vasconcelos, Nuno. "Minimum probability of error image retrieval." IEEE Transactions on signal Processing 52, no. 8 (2004): 2322-2336.

Vasconcelos, Nuno. "On the efficient evaluation of probabilistic similarity functions for image retrieval." IEEE Transactions on Information Theory 50, no. 7 (2004): 1482-1496.

Hove, Lars-Jacob. "Extending image retrieval systems with a thesaurus for shapes." In Norsk Informatikk Konferanse, Stavanger, Tapir Akademisk Forlag. 2004.

Berg, Tamara L., Alexander C. Berg, Jaety Edwards, Michael Maire, Ryan White, Yee-Whye Teh, Erik Learned-Miller, and David A. Forsyth. "Names and faces in the news." In Proceedings of the 2004 IEEE Computer Society Conference on Computer Vision and Pattern Recognition, 2004. CVPR 2004, vol. 2, pp. II-II. IEEE, 2004.

Quack, Till, Ullrich Mönich, Lars Thiele, and B. S. Manjunath. "Cortina: a system for large-scale, content-based web image retrieval." In Proceedings of the 12th annual ACM international conference on Multimedia, pp. 508-511. 2004.

Eidenberger, H. "A new perspective on visual information retrieval. SPIE Electronic Imaging Symposium, San Jose." (2004).

Town, Christopher, and David Sinclair. "Language-based querying of image collections on the basis of an extensible ontology." Image and Vision Computing 22, no. 3 (2004): 251-267.

Bartolini, Ilaria, Paolo Ciaccia, and Marco Patella. "The PIBE personalizable image browsing engine." In Proceedings of the 1st international workshop on Computer vision meets databases, pp. 43-50. 2004.

Jaffré, Gaël, and Philippe Joly. "Costume: A new feature for automatic video content indexing." In Proceedings of RIAO, pp. 314-325. Avignon France, 2004.

Arandjelovic, Ognjen, and Andrew Zisserman. "Automatic face recognition for film character retrieval in feature-length films." In 2005 IEEE Computer Society Conference on Computer Vision and Pattern Recognition (CVPR'05), vol. 1, pp. 860-867. IEEE, 2005.

Rouw, M. "Meaningful Image Spaces and Project PhotoIndex." PhD diss., Masters Thesis, Utrecht School of the Arts, Hilversum, the Netherlands, 2005.

Lew, Michael S., Nicu Sebe, Chabane Djeraba, and Ramesh Jain. "Content-based multimedia information retrieval: State of the art and challenges." ACM Transactions on Multimedia Computing, Communications, and Applications (TOMM) 2, no. 1 (2006): 1-19.

Bartolini, Ilaria, Paolo Ciaccia, and Marco Patella. "Adaptively browsing image databases with PIBE." Multimedia Tools and Applications 31, no. 3 (2006): 269-286.

Jacobs, Charles E., Adam Finkelstein, and David H. Salesin. "Fast multiresolution image querying." In Proceedings of the 22nd annual conference on Computer graphics and interactive techniques, pp. 277-286. 1995.

Hertzmann, Aaron, Charles E. Jacobs, Nuria Oliver, Brian Curless, and David H. Salesin. "Image analogies." In Proceedings of the 28th annual conference on Computer graphics and interactive techniques, pp. 327-340. 2001.

Bartolini, Ilaria, and Paolo Ciaccia. "Imagination: exploiting link analysis for accurate image annotation." In International Workshop on Adaptive Multimedia Retrieval, pp. 32-44. Springer, Berlin, Heidelberg, 2007.

Hove, Lars-Jacob. "Evaluating use of interfaces for visual query specification." Proceedings of NOBOKIT (2007).

Vasconcelos, Nuno. "From pixels to semantic spaces: Advances in content-based image retrieval." Computer 40, no. 7 (2007): 20-26.

Marée, Raphaël, Pierre Geurts, and Louis Wehenkel. "Content-based image retrieval by indexing random subwindows with randomized trees." In Asian Conference on Computer Vision, pp. 611-620. Springer, Berlin, Heidelberg, 2007.

Datta, Ritendra, Dhiraj Joshi, Jia Li, and James Z. Wang. "Image retrieval: Ideas, influences, and trends of the new age." ACM Computing Surveys (Csur) 40, no. 2 (2008): 1-60.

Li, Jia, and James Z. Wang. "Real-time computerized annotation of pictures." IEEE transactions on pattern analysis and machine intelligence 30, no. 6 (2008): 985-1002.

Bartolini, Ilaria, Paolo Ciaccia, and Marco Patella. "Query processing issues in region-based image databases." Knowledge and Information Systems 25, no. 2 (2010): 389-420.

Bartolini, Ilaria, Marco Patella, and Corrado Romani. "Shiatsu: semantic-based hierarchical automatic tagging of videos by segmentation using cuts." In Proceedings of the 3rd international workshop on Automated information extraction in media production, pp. 57-62. 2010.

Bartolini, Ilaria, and Corrado Romani. "Efficient and effective similarity-based video retrieval." In Proceedings of the Third International Conference on SImilarity Search and APplications, pp. 133-134. 2010.

Bartolini, Ilaria, and Paolo Ciaccia. "Multi-dimensional keyword-based image annotation and search." In Proceedings of the 2nd international workshop on keyword search on structured data, pp. 1-6. 2010.

Bartolini, Ilaria, Marco Patella, and Guido Stromei. "The windsurf library for the efficient retrieval of multimedia hierarchical data." In Proceedings of the International Conference on Signal Processing and Multimedia Applications, pp. 1-10. IEEE, 2011.

Joly, Alexis, Hervé Goëau, Pierre Bonnet, Vera Bakić, Julien Barbe, Souheil Selmi, Itheri Yahiaoui et al. "Pl@ntNet: Interactive plant identification based on social image data." Ecological Informatics 23 (2014): 22-34.

Van, Thanh The, and Thanh Manh Le. "Content-based image retrieval based on binary signatures cluster graph." Expert Systems 35, no. 1 (2018): e12220.

Luo, Qingjun, Shiliang Zhang, Tiejun Huang, Wen Gao, and Qi Tian. "Superimage: Packing semantic-relevant images for indexing and retrieval." In Proceedings of International Conference on Multimedia Retrieval, pp. 41-48. 2014.

Moise, Diana, Denis Shestakov, Gylfi Gudmundsson, and Laurent Amsaleg. "Indexing and searching 100 m images with map-reduce." In Proceedings of the 3rd ACM conference on International conference on multimedia retrieval, pp. 17-24. 2013.

Jyothi, N., D. Madhavi, and M. R. Patnaik. "Optimization of Log Gabor Filters Using Genetic Algorithm for Query by Image Content Systems." In Intelligent Communication, Control and Devices, pp. 799-806. Springer, Singapore, 2020.

Deepak, Gerard, and J. Sheeba Priyadarshini. "Personalized and Enhanced Hybridized Semantic Algorithm for web image retrieval incorporating ontology classification, strategic query expansion, and content-based analysis." Computers & Electrical Engineering 72 (2018): 14-25.

Latif, Afshan, Aqsa Rasheed, Umer Sajid, Jameel Ahmed, Nouman Ali, Naeem Iqbal Ratyal, Bushra Zafar, Saadat Hanif Dar, Muhammad Sajid, and Tehmina Khalil. "Content-based image retrieval and feature extraction: a comprehensive review." Mathematical Problems in Engineering 2019 (2019).

Saritha, R. Rani, Varghese Paul, and P. Ganesh Kumar. "Content based image retrieval using deep learning process." Cluster Computing 22, no. 2 (2019): 4187-4200.

Alsmadi, Mutasem K. "Query-sensitive similarity measure for content-based image retrieval using meta-heuristic algorithm." Journal of King Saud University-Computer and Information Sciences 30, no. 3 (2018): 373-381.

Unar, Salahuddin, Xingyuan Wang, Chunpeng Wang, and Yu Wang. "A decisive content based image retrieval approach for feature fusion in visual and textual images." Knowledge-Based Systems 179 (2019): 8-20.

Jian, Muwei, Yilong Yin, Junyu Dong, and Kin-Man Lam. "Content-based image retrieval via a hierarchical-local-feature extraction scheme." Multimedia Tools and Applications 77, no. 21 (2018): 29099-29117.

Jain, Nitesh, and Ojaswi Gupta. "A modern and simplified approach for Content Based Image Retrieval."

Theetchenya, S., Somula Ramasubbareddy, S. Sankar, and Syed Muzamil Basha. "Hybrid approach for content-based image retrieval." International Journal of Data Science 6, no. 1 (2021): 45-56.

Appiah, Obed, J. B. Hayfron-Acquah, and Michael Asante. "Real-Time Motion Detection and Surveillance using Approximation of Image Pre-processing Algorithms." In 2019 IEEE AFRICON, pp. 1-8. IEEE, 2019.

Blasch, Erik, Alex Aved, and Shuvra S. Bhattacharyya. "Dynamic data driven application systems (DDDAS) for multimedia content analysis." In Handbook of Dynamic Data Driven Applications Systems, pp. 631-651. Springer, Cham, 2018.

Koyuncu, Hakan, Manish Dixit, and Baki Koyuncu. "An analysis of content-based image retrieval." International Advanced Researches and Engineering Journal 5, no. 1 (2021): 123-141.

Alrahhal, Maher, and K. P. Supreethi. "Content-based image retrieval using local patterns and supervised machine learning techniques." In 2019 Amity International Conference on Artificial Intelligence (AICAI), pp. 118-124. IEEE, 2019.

Admile, Nandkumar S. "A survey on different image retrieval techniques." International Research Journal of Engineering and Technology (IRJET-2018) 5, no. 10 (2018).

Bansal, Maggi, and Sukhwinder Singh. "Content-Based Image Retrieval: A Review." (2018)

Tadepalli, Yasasvy, Meenakshi Kollati, Swaraja Kuraparthi, Padmavathi Kora, Anil Kumar Budati, and Lakshmi Kala Pampana. "Content-based image retrieval using Gaussian— Hermite moments and firefly and grey wolf optimization." CAAI Transactions on Intelligence Technology 6, no. 2 (2021): 135-146.

Latif, Afshan, Aqsa Rasheed, Umer Sajid, Jameel Ahmed, Nouman Ali, Naeem Iqbal Ratyal, Bushra Zafar, Saadat Hanif Dar, Muhammad Sajid, and Tehmina Khalil. "Content-based image retrieval and feature extraction: a comprehensive review." Mathematical Problems in Engineering 2019 (2019).

Hasoon, Jamal N., and Rehab Hassan. "Face Image Retrieval Based on Fireworks Algorithm." In 2019 1st AL-Noor International Conference for Science and Technology (NICST), pp. 94-99. IEEE, 2019.

Ahmad, Faiyaz, and Tanvir Ahmad. "Image Mining Based on Deep Belief Neural Network and Feature Matching Approach Using Manhattan Distance." Computer Assisted Methods in Engineering and Science 28, no. 2 (2021): 139-167.

U.S. patent and patent application Nos. 20220067992; 20220019849; 20210407832; 11210797; 20210374460; 20210374479; 20210340692; 20210310200; 11107219; 20210248624; 20210241273; 20210241304; 20210232632; 20210233087; 20210232801; 20210233123; 20210233106; 20210224245; 11055576; 11055566; 11049054; 20210182701; 20210182686; 11023473; 20210156693; 20210160721; 20210160660; 10997589; 20210121851; 20210103922; 10962939; 20210064761; 20210058386; 20210049322; 20200340907; 10819789; 10817804; 10812988; 20200269688; 20200216026; 10706098; 10691473; 10659851; 10656898; 20200150752; 20200104940; 10607084; 20200074515; 20200050949; 10546210; 10535201; 10475208; 20190320008; 20190289697;

20190286649; 10410182; 10402641; 20190265319; 20190258895; 10360303; 10361802; 20190179946; 10277953; 10262290; 10255294; 20190095535; 20190065506; 20190026313; 20180239784; 20180095652; 9910897; 9852188; 20170364537; 20170351710; 20170351709; 20170329804; 20170330054; 20170297988; 9715875; 9683853; 20170161428; 20170154240; 9667903; 9632650; 9628419; 9615050; 9582517; 9547647; 9532086; 20160364629; 20160350886; 9449026; 9398326; 9390236; 20160170996; 9367523; 20160148072; 9330722; 20160103830; 9245195; 9230151; 20150363660; 9177146; 20150294187; 9147125; 20150227796; 20150186425; 20150178786; 20150170333; 9060175; 9053562; 9042923; 9025811; 9020415; 9015139; 9015093; 9008438; 8983941; 8942985; 8924993; 20140348423; 20140330594; 20140310255; 8861898; 20140304107; 8849020; 8849058; 8849050; 20140279584; 20140244317; 8775341; 20140188844; 20140185947; 20140188931; 20140149940; 8732739; 20140129261; 20140088952; 20140080428; 8676832; 8671069; 20130329092; 8583615; 8571850; 8488682; 8489627; 20130156305; 8458606; 8457416; 8452794; 8447752; 8429163; 8407201; 8407230; 8406573; 8396876; 8385971; 8370869; 8364673; 20120321174; 8316238; 20120278244; 20120248412; 8205237; 8165406; 20120093421; 20120092357; 8145015; 20120036016; 20110255738; 8032840; 20110211772; 20110212717; 8010988; 20110179452; 20110143811; 20110129159; 20110106782; 20110103699; 7933338; 7916976; 20110069896; 20110034176; 7860317; 20100322518; 7849092; 20100262616; 7778821; 20100183225; 7760935; 20100138422; 20100131571; 20100125568; 20100121844; 7702152; 20100082615; 7684651; 20100070448; 20100054596; 20100046842; 7647331; 20090324100; 20090313556; 20090300055; 7613993; 7610306; 20090265404; 20090254510; 7594177; 20090171783; 7551172; 20090157711; 20090110275; 7526413; 20090070302; 20090070321; 20090054157; 7469064; 7457825; 20080263012; 7421125; 20080208791; 20080209010; 20080181510; 7401097; 7362921; 7356766; 7346844; 7340481; 7333963; 7325010; 7318053; 7308443; 7302117; 7283992; 20070236712; 20070233733; 7272593; 20070196032; 7242988; 20070133947; 7231381; 20070110306; 7197491; 7181438; 20070025637; 20060257027; 20060251292; 20060251338; 20060251339; 20060253491; 7130864; 20060200259; 7103237; 7089239; 7076494; 7065521; 20060112092; 20060110036; 20060110035; 20060110021; 7051271; 7043488; 7020192; 20060050993; 7006881; 7007034; 20060031486; 20060031216; 6996572; 6986102; 6976053; 20050265607; 6968366; 6961736; 6959339; 20050226496; 6941323; 20050187975; 6912250; 20050100219; 6886000; 6868525; 20050044056; 20050041863; 6850252; 20050021677; 20050021512; 6847980; 20050002571; 6839701; 20040202385; 6804394; 6801657; 6801661; 20040181548; 6778946; 6774917; 6763148; 6760714; 6751195; 6751354; 6748398; 6745240; 6741655; 6731826; 6728752; 20040068496; 6711287; 6701014; 6697532; 6694311; 20040024778; 6681060; 6665841; 20030212666; 6647141; 20030195883; 6628305; 6625311; 6621926; 6611834; 6611840; 6611609; 6606623; 20030123737; 6584221; 6581102; 20030110181; 6574378; 6567797; 20030093437; 6564202; 20030088346; 20030088387; 20030074368; 20030074369; 20030053693; 20030041047; 20030037073; 20030033300; 6519697; 6504571; 20020191021; 20020176626; 20020176629; 20020174122; 6453325; 6449627; 20020122137; 20020122596; 6446099; 6445834; 6446060; 20020107718; 20020097914; 6418526; 6418424; 6415282; 6411953; 6412002; 6405198; 6405215; 20020069218; 6400996; 20020057343; 6381510; 6370541; 20020029232; 20020026449; 20020026471; 20020002550; 20010056415; 6332037; 20010046332; 6323877; 6317740; 6301440; 20010024517; 6282299; 6272488; 6272634; 6263342; 20010003182; 6243713; 6240423; 6240424; 6233586; 6233547; 6226387; 6192150; 6181817; 6182069; 6181818; 6175829; 6169998; 6147972; 6134541; 6121969; 6122628; 6091729; 6072904; 6061793; 6035055; 6031914; 6029160; 6011872; 6005603; 5999664; 5987468; 5987459; 5982931; 5983218; 5983237; 5966139; 5963670; 5933546; 5930783; 5920856; 5915250; 5913205; 5911139; 5899999; 5895464; 5893110; 5893095; 5875446; 5873080; 5870754; 5852823; 5845288; 5838830; 5819288; 5806061; 5799310; 5793888; 5794249; 5781906; 5767893; 5745610; 5696964; 5579471; and 5452239.

Frame Preprocessing at the Edge

On-site processing at the edge is the most ideal solution. The video frames are processed immediately once they are collected by the camera, minimizing the communication overhead incurred by the raw video transmission through the network. Although the query is initialized from the operator through the cloud and fog nodes, most of the raw footage data is not relevant. Actually, the useful information can be delivered back to the node that initiated the query using a small number of bytes, which results from the deep model feature extraction and object of interest cropped frame sections.

In cases where multiple nodes have responsive and overlapping or partially redundant information responsive to a query, different styles of responses may be generated. For example, a node with a "good" view may provide a live stream to the requestor, while other nodes provide highly compressed or abstracted information. This type of strategy will depend on bandwidth constraints, communication costs, etc. However, various hybrid approaches are consistent with the present technology, and the operation of each SBC and fog node may be independent of the others. On the other hand, coordination of the network may be at various levels, for example a centralized control at the query generator/response consolidator, a decentralized control implemented by the fog nodes and/or central node, a hierarchical control, etc.

The fog node preferably handles the query matching and video retrieval. The results are then reported back to the operator along with the ID of the camera with the detected objects. An unsupervised classification model may give the center of the pixel values containing the sections of interest and the center is translated to human-readable color names before report generation at the fog. This process is a computing-intensive task accomplished by the fog node reducing the communication traffic and removing the dependence on the remote cloud node. A preference for human readable labels is that this is highly compatible with human-generated queries. However, various types of automated machine translation or processing alleviate a strict need for human comprehension at all levels.

According to one implementation, a real-time human pose estimation model based on the OpenPose in the TensorFlow framework. The edge node feeds the video frames to the Open Pose model to get the human key points. The DNN model is trained on COCO data set (Lin, Tsung-Yi, Michael Maire, Serge Belongie, James Hays, Pietro Perona, Deva Ramanan, Piotr Dollar, and C. Lawrence Zitnick. "Microsoft coco: Common objects in context." In European conference on computer vision, pp. 740-755. Springer, Cham, 2014) with more than 64,000 images for 2D pose estimation. This model is deployed in a docker container. The container removes the need for environment preparations and may receive the frame through the open port. By the implementation of the post-processing, the results are in the format of a string for each frame. On the output of the model, there are two branches; one to give the confidence score in the body-joint being predicted and the part affinity fields for parts association. Each branch has multiple stages of convolutional layers providing a feature map. At the end of each stage, the results in the feature map produced in the confidence branch are summed up with the resulting feature map from the part affinity fields.

In this button-up approach, post-processing is required after the model gives the results so that the points are grouped for each human. This task is done through grouping the points based on the connection between them and the direction of the connection link between each pair of keypoints. The model has 75.6 mean-Average Precision on the COCO test data, improving the accuracy of the human gesture estimation in comparison with other models. The approach demonstrates moderate, but manageable, resource consumption on a Raspberry Pi (e.g., Model 3B, Model 4B) board.

The output from each batch of edge devices is sent to a fog node along with the areas of interest, where the query-matching procedure will be completed, and the results will be reported to the operator.

Unsupervised Query Matching

Before the search starts, the algorithm receives a query, which is at a descriptive or abstract level, such as a string query with a structure from the user. The user may submit the query through a cloud node or a fog node, which will communicate with the corresponding edge nodes. In some cases, the query is generated by artificial intelligence, or drawn from a library or database of predetermined searches.

In the case of a human user, the user enters a description of the information they are looking for, such as the number of the colors they are after in each section of the body. For example, the input from the user can be "blue jeans", "red hat", "grey T-shirt", etc. Other descriptions may be employed, such as skin color, hair color, height, sex, body morphology, clothing type, bags carried, vehicles, or other descriptors. In typical surveillance, there may be a limited set of features of interest, and therefore filters may be tuned to detect the features or classes of features. Transfer learning may be employed to gain intelligence across the distributed network based on local learned features, and in some cases, the transfer may be sufficiently fast to tack objects as they move within an environment. This prevents the user from having to have access to the public information before having specific description of the person of interest.

Grouping pixel values of an image helps with the unsupervised pixel classification, given the number of colors to be expected in each body section.

The fog node then sends a request to all of the edge nodes that it connects to, in order to process the most recent frame that is captured by the camera in an area. Where the edge nodes have overlapping environmental sensing, the fog node may coordinate sensor fusion.

On receiving the request from the fog node, the edge nodes feed the frame(s) received from the edge nodes to its pre-trained deep neural network (DNN), which yields a string representing each of the identifiable objects (e.g., people) in the frame as well as morphological degrees of freedom, e.g., all of the body joints and their connections. These connections are useful for human pose detection along with the body skeleton. In the non-limiting examples discussed herein, these points are leveraged to capture parts of the body and face to allocate the colors the query is interested in.

The object identifications and degrees of freedom are then sent by the edge nodes back to the respective fog node, where all received sections are analyzed.

The pixels of the frame image are translated into a color that can be used to match the description given by the query. This function is accomplished through a combination of a k-nearest neighbor (kNN) algorithm and a hash-map data structure.

The image of a frame containing a human may be segmented into body parts. The color of each part of the detected human body identified with a kNN, wherein pixel values are the kNN features. The number of neighborhoods is given by the user for, e.g., the shirt and pants color. One neighborhood may be provided for the face color and one for the hair color. The kNN clustering representation shows the pixels' scattering in the body blob of the sample image. Estimating the number of neighborhoods also helps with noise reduction such as removing a shadow line across the body from which those pixels are considered as outliers and may not change the neighborhood center. See:
en.wikipedia.org/wiki/K-nearest_neighbors_algorithm
Imandoust, Sadegh Bafandeh, and Mohammad Bolandraftar. "Application of k-nearest neighbor (knn) approach for predicting economic events: Theoretical background." International Journal of Engineering Research and Applications 3, no. 5 (2013): 605-610.
Peterson, Leif E. "K-nearest neighbor." Scholarpedia 4, no. 2 (2009): 1883.
Adeniyi, David Adedayo, Zhaoqiang Wei, and Y. Yongquan. "Automated web usage data mining and recommendation system using K-Nearest Neighbor (KNN) classification method." Applied Computing and Informatics 12, no. 1 (2016): 90-108.
Zhang, Min-Ling, and Zhi-Hua Zhou. "A k-nearest neighbor based algorithm for multi-label classification." In 2005 IEEE international conference on granular computing, vol. 2, pp. 718-721. IEEE, 2005.
Bhatia, Nitin. "Survey of nearest neighbor techniques." arXiv preprint arXiv:1007.0085 (2010).
Song, Yang, Jian Huang, Ding Zhou, Hongyuan Zha, and C. Lee Giles. "Iknn: Informative k-nearest neighbor pattern classification." In European Conference on Principles of Data Mining and Knowledge Discovery, pp. 248-264. Springer, Berlin, Heidelberg, 2007.
Wang, Lei, Latifur Khan, and Bhavani Thuraisingham. "An effective evidence theory based k-nearest neighbor (knn) classification." In 2008 IEEE/WIC/ACM International Conference on Web Intelligence and Intelligent Agent Technology, vol. 1, pp. 797-801. IEEE, 2008.
Abu Alfeilat, Haneen Arafat, Ahmad B A Hassanat, Omar Lasassmeh, Ahmad S. Tarawneh, Mahmoud Bashir Alhasanat, Hamzeh S. Eyal Salman, and VB Surya Prasath. "Effects of distance measure choice on k-nearest neighbor classifier performance: a review." Big data 7, no. 4 (2019): 221-248.

Jiang, Liangxiao, Zhihua Cai, Dianhong Wang, and Siwei Jiang. "Survey of improving k-nearest-neighbor for classification." In Fourth international conference on fuzzy systems and knowledge discovery (FSKD 2007), vol. 1, pp. 679-683. IEEE, 2007.

Liao, Yihua, and V. Rao Vemuri. "Use of k-nearest neighbor classifier for intrusion detection." Computers & security 21, no. 5 (2002): 439-448.

Suguna, N., and K. Thanushkodi. "An improved k-nearest neighbor classification using genetic algorithm." International Journal of Computer Science Issues 7, no. 2 (2010): 18-21.

Sun, Shiliang, and Rongqing Huang. "An adaptive k-nearest neighbor algorithm." In 2010 seventh international conference on fuzzy systems and knowledge discovery, vol. 1, pp. 91-94. IEEE, 2010.

Kramer, Oliver. "K-nearest neighbors." In Dimensionality reduction with unsupervised nearest neighbors, pp. 13-23. Springer, Berlin, Heidelberg, 2013.

Prasath, V. B., Haneen Arafat Abu Alfeilat, Ahmad Hassanat, Omar Lasassmeh, Ahmad S. Tarawneh, Mahmoud Bashir Alhasanat, and Hamzeh S. Eyal Salman. "Distance and Similarity Measures Effect on the Performance of K-Nearest Neighbor Classifier—A Review." arXiv preprint arXiv:1708.04321 (2017).

Fayed, Hatem A., and Amir F. Atiya. "A novel template reduction approach for the K-nearest neighbor method." IEEE Transactions on Neural Networks 20, no. 5 (2009): 890-896.

Lubis, Arif Ridho, and Muharman Lubis. "Optimization of distance formula in K-Nearest Neighbor method." Bulletin of Electrical Engineering and Informatics 9, no. 1 (2020): 326-338.

Garcia, Vincent, Eric Debreuve, and Michel Barlaud. "Fast k nearest neighbor search using GPU." In 2008 IEEE Computer Society Conference on Computer Vision and Pattern Recognition Workshops, pp. 1-6. IEEE, 2008.

Parvin, Hamid, Hosein Alizadeh, and Behrouz Minaei-Bidgoli. "MKNN: Modified k-nearest neighbor." In Proceedings of the world congress on engineering and computer science, vol. 1. Newswood Limited, 2008.

Zhang, Youqiang, Guo Cao, Bisheng Wang, and Xuesong Li. "A novel ensemble method for k-nearest neighbor." Pattern Recognition 85 (2019): 13-25.

Yu, Zhiwen, Hantao Chen, Jiming Liu, Jane You, Hareton Leung, and Guoqiang Han. "Hybrid k-nearest neighbor classifier." IEEE transactions on cybernetics 46, no. 6 (2015): 1263-1275.

Moosavian, A., H. Ahmadi, A. Tabatabaeefar, and M. Khazaee. "Comparison of two classifiers; K-nearest neighbor and artificial neural network, for fault diagnosis on a main engine journal-bearing." Shock and Vibration 20, no. 2 (2013): 263-272.

Dhanabal, S., and S. J. I. J. C. A. Chandramathi. "A review of various k-nearest neighbor query processing techniques." International Journal of Computer Applications 31, no. 7 (2011): 14-22.

The center or centroid of each neighborhood is the mean of data distribution corresponding to the body section reported in the colorspace, e.g., RGB format. In order for the fog node to compare the results with the query, the last step is to translate the center values of the respective neighborhood to a color name. The colors of the shirt and pants are translated through a 24 hash-map color dictionary where the pixel ranges are mapped to color names. This than permits semantic querying. More detailed names are rarely used in police reports and general colors such as "red" or "blue" cover a variety of colors. However, assuming the surveillance system is intended to be used with standard police reports, the system may be trained over semantic range of the police reports. Therefore, one can ensure that the semantic responsivity of the fog nodes corresponds to the queries that they are likely to receive. The color map for the face and hair may be simple, such as "white" and "black" to present the skin color and "black", "brown", "blond", "red" and "other" to represent the hair colors.

This generalization also reduces the error due to the noise or other light elements that may present a color slightly different. That is, while the queries may reliably include words or concepts for which the system has a capability of properly responding, the images themselves are less constrained.

The results from the fog node is presented to the operator who can make a final decision. The fog node compares the descriptions in the query from the operator to the results of the colors. In case of a match, the frame sequence and the camera ID along with the frame are sent back to the operator.

The I-ViSE system prototype reads real-time video frames and performs a search responsive to a query entered in an average of two seconds. Because of the hierarchical architecture, the system is scalable, such that latencies are controlled as the system grows.

I-ViSE also has the capability to create an index table on the fog device for future searches. The fog device may be a typical Windows 10/11, UNIX, Linux, MacOS, etc., and therefore may employ traditional database technologies, including relational, SQL, NoSQL, etc. See en.wikipedia.org/wiki/Database; en.wikipedia.org/wiki/SQL; en.wikipedia.org/wiki/NoSQL; en.wikipedia.org/wiki/Relational_database.

The operator may search through the large-scale smart surveillance system video archive platform with high-level, subjective descriptions, such as the color of clothes or the hair of a human. I-ViSE allows the operator to search by keywords and feature descriptions using unsupervised queries, which is a highly desired function for today's smart public safety surveillance systems. The I-ViSE technology can be either mounted on existing security surveillance systems or integrated as a function in pervasive surveillance systems in Smart Cities or Smart Communities, like a university campus.

I-ViSE enables real-time video querying without violating people's privacy. This results from need to identify the content of a frame in a query in order to obtain the frame contents. Therefore, according to a privacy-preserving embodiment, the SBCs and fog nodes limit access to full data in dependence on bona fide queries which identify the content of the full data.

A microservices architecture design within the edge hierarchy platform is provided, which makes the query management algorithm lightweight and robust.

An unsupervised training method is provided that accurately matches the query to the data to be returned, e.g., pixel blob.

A prototype was implemented using Raspberry Pi verifying the effectiveness of the decentralized query method in terms of delay, resource consumption, and detection accuracy.

Situation AWareness (SAW) is essential for many mission-critical applications. However, SAW is challenging when trying to immediately identify objects of interest or focus on suspicious activities from thousands of video frames.

The present technology provides a queryable system to instantly select interesting content. While face recognition technology is mature, in many scenarios like public safety monitoring, the features of objects of interest may be much more complicated than face features, or represent many other characteristics that facial characteristics. In addition, human operators may not be always able to provide a descriptive, simple, and accurate query. More often, there are only rough, general descriptions of certain suspicious objects or accidents.

The non-limiting examples discussed herein propose an Interactive Video Surveillance as an Edge service (I-ViSE) based on unsupervised feature queries. Adopting unsupervised methods that do not reveal any private information, the I-ViSE scheme utilizes general features of a human body and color of clothes.

An I-ViSE prototype is built following the edge-fog computing paradigm and the experimental results verified the I-ViSE scheme meets the design goal of scene recognition and target analysis in less than two seconds.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 7 shows a list of colors applied in the prototype, according to embodiments of the disclosure.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

Figure 1:
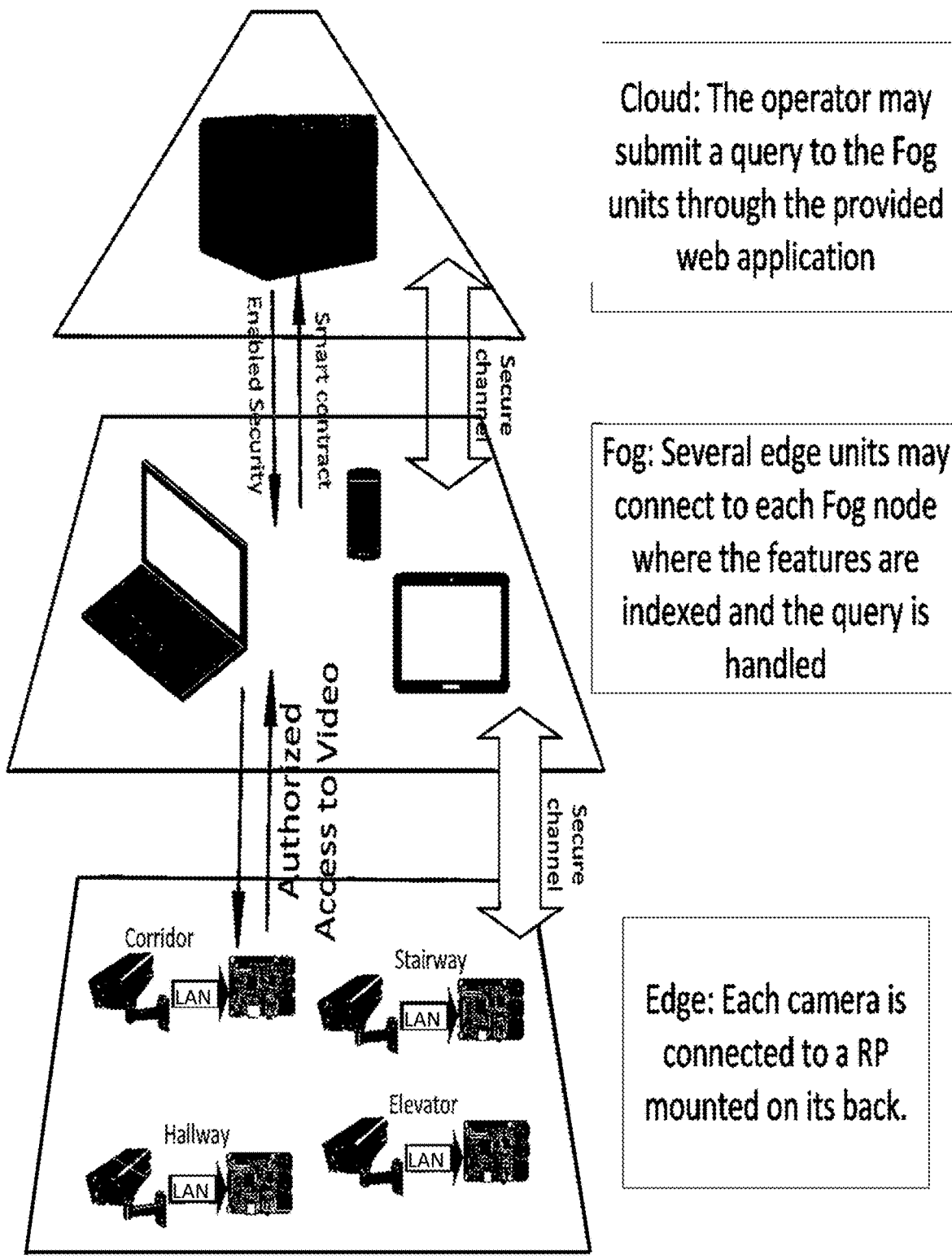
FIG. 1 shows a layered smart surveillance system hierarchy using the edge-fog-cloud computing paradigm, according to embodiments of the disclosure.

In order to clearly describe the current disclosure it will become necessary to select certain terminology when referring to and describing relevant components within the disclosure. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

As discussed herein, the disclosure relates generally to video surveillance, and more particularly, to systems and methods for real-time video querying and objects of interest detection.

These and other embodiments are discussed below with reference to FIGS. 1-13. However, those skilled in the art will readily appreciate that the detailed description given herein with respect to these Figures is for explanatory purposes only and should not be construed as limiting.

Non-limiting examples of systems and methods discussed herein may enhance security surveillance through the efficient design of queryable operations. The query responses selectively highlight meaningful content and instantly provide interactive knowledge of mission-critical tasks. The systems and methods provide surveillance systems that are queryable and privacy-preserving.

A non-limiting example of a security surveillance algorithm is expected to fulfill the following functions without violating people's privacy: (1) identify the object of interest, (2) match the video frames with the description query, and (3) report the camera ID or geo-location. Although face recognition-based approaches are very mature today, it brings up deep concerns on privacy violation. In many practical application scenarios like public safety monitoring, features of objects of interest may be much more complicated than facial feature recognition. In addition, the operators may not be always able to provide simple, concise, and accurate queries. Actually, it is more often that operators merely provide rough, general, and uncertain descriptions of certain suspicious objects or accidents.

The non-limiting examples discussed herein propose an Interactive Video Surveillance as an Edge service (I-ViSE) based on unsupervised queries, which allows the operator to search by keywords and feature descriptions. The I-ViSE system matches query searches with captured video frames where the objects of interest appear. The I-ViSE search platform gives the option to utilize a set of microservices to look for features in a mathematical model such as objects, people, color, and behaviors. Adopting unsupervised classification methods, the I-ViSE scheme works allows searching of general features such as a human body and color of clothes, while not violating the privacy of residents being monitored. The I-ViSE prototype is built following the edge-fog computing paradigm and the experimental results verify the I-ViSE scheme meets the real-time requirements. In summary, the contributions of I-ViSE can be itemized as follows:

A microservices architecture design within the edge hierarchy platform is introduced, which makes the query management algorithm lightweight and robust.

An unsupervised training method is provided that accurately matches the query to the pixel blob.

A prototype is implemented using Raspberry Pi verifying the effectiveness of the decentralized query method in terms of delay, resource consumption, and the detection accuracy.

Microservices

A microservices architecture, a variant of the service-oriented architecture (SOA) structural style, supports development of lightweight applications for the edge environment as a collection of loosely coupled, fine-grained applications.

The traditional service-oriented architecture (SOA) is monolithic, constituting different software features in a single interconnected database and interdependent applications. While the tightly coupled dependence among functions and components enables a single package, such a monolithic architecture lacks the flexibility to support continuous development and streaming data delivery, which is critical in today's quickly changing and highly heterogeneous environment.

Microservices architectures have been adopted to revitalize the monolithic architecture-based applications, including the modern commercial web application. The flexibility of microservices enables continuous, efficient, and independent deployment of application function units. Significant features of microservices include fine granularity, which means each of the microservices can be developed in different frameworks like programming languages or resources, and loose coupling where the components are independent of function deployment and development.

A microservices architecture has been investigated in smart solutions to enhance the scalability and security of applications. It was used to implement an intelligent transportation system that incorporates and combines IoT to help planning for rapid bus systems. In another application, the microservices architecture was used to develop a smart city IoT platform where each microservice is regarded as an engineering department. The independent behavior of each microservice allows flexibility of selecting the development platform, and the communication protocols are simplified without requiring a middleware. See, Aderaldo, Carlos M., Nabor C. Mendonca, Claus Pahl, and Pooyan Jamshidi. "Benchmark requirements for microservices architecture research." In 2017 IEEE/ACM 1st International Workshop on Establishing the Community-Wide Infrastructure for Architecture-Based Software Engineering (ECASE), pp. 8-13. IEEE, 2017.

Al-Masri, Eyhab. "Enhancing the microservices architecture for the internet of things." In 2018 IEEE International Conference on Big Data (Big Data), pp. 5119-5125. IEEE, 2018.

Balalaie, Armin, Abbas Heydarnoori, and Pooyan Jamshidi. "Microservices architecture enables devops: Migration to a cloud-native architecture." Ieee Software 33, no. 3 (2016): 42-52.

Buzachis, Alina, Antonino Galletta, Lorenzo Carnevale, Antonio Celesti, Maria Fazio, and Massimo Villari. "Towards osmotic computing: Analyzing overlay network solutions to optimize the deployment of container-based microservices in fog, edge and iot environments." In 2018 IEEE 2nd International Conference on Fog and Edge Computing (ICFEC), pp. 1-10. IEEE, 2018.

De Lauretis, Lorenzo. "From monolithic architecture to microservices architecture." In 2019 IEEE International Symposium on Software Reliability Engineering Workshops (ISSREW), pp. 93-96. IEEE, 2019.

de Santana, Cleber Jorge Lira, Brenno de Mello Alencar, and Cássio V. Serafim Prazeres. "Reactive microservices for the internet of things: A case study in fog computing." In Proceedings of the 34th ACM/SIGAPP Symposium on Applied Computing, pp. 1243-1251. 2019.

Ghofrani, Javad, and Daniel Lübke. "Challenges of Microservices Architecture: A Survey on the State of the Practice." ZEUS 2018 (2018): 1-8.

Guo, Dong, Wei Wang, Guosun Zeng, and Zerong Wei. "Microservices architecture based cloudware deployment platform for service computing." In 2016 IEEE Symposium on Service-Oriented System Engineering (SOSE), pp. 358-363. IEEE, 2016.

Jaramillo, David, Duy V. Nguyen, and Robert Smart. "Leveraging microservices architecture by using Docker technology." In SoutheastCon 2016, pp. 1-5. IEEE, 2016.

Li, Shanshan, He Zhang, Zijia Jia, Chenxing Zhong, Cheng Zhang, Zhihao Shan, Jinfeng Shen, and Muhammad Ali Babar. "Understanding and addressing quality attributes of microservices architecture: A Systematic literature review." Information and Software Technology 131 (2021): 106449.

Naha, Ranesh Kumar, Saurabh Garg, Dimitrios Georgakopoulos, Prem Prakash Jayaraman, Longxiang Gao, Yong Xiang, and Rajiv Ranjan. "Fog computing: Survey of trends, architectures, requirements, and research directions." IEEE access 6 (2018): 47980-48009.

O'Connor, Rory V., Peter Elger, and Paul M. Clarke. "Continuous software engineering—A microservices architecture perspective." Journal of Software: Evolution and Process 29, no. 11 (2017): e1866.

Pallewatta, Samodha, Vassilis Kostakos, and Rajkumar Buyya. "Microservices-based IoT application placement within heterogeneous and resource constrained fog computing environments." In Proceedings of the 12th IEEE/ACM International Conference on Utility and Cloud Computing, pp. 71-81. 2019.

Pallewatta, Samodha, Vassilis Kostakos, and Rajkumar Buyya. "QoS-aware placement of microservices-based IoT applications in Fog computing environments." Future Generation Computer Systems (2022).

Perez de Prado, Rocío, Sebastian Garcia-Galan, José Enrique Muñoz-Expósito, Adam Marchewka, and Nicolás Ruiz-Reyes. "Smart containers schedulers for microservices provision in cloud-fog-IoT networks. Challenges and opportunities." Sensors 20, no. 6 (2020): 1714.

Salah, Tasneem, M. Jamal Zemerly, Chan Yeob Yeun, Mahmoud Al-Qutayri, and Yousof Al-Hammadi. "The evolution of distributed systems towards microservices architecture." In 2016 11th International Conference for Internet Technology and Secured Transactions (ICITST), pp. 318-325. IEEE, 2016.

Selimi, Mennan, Llorenç Cerdà-Alabern, Marc Sánchez-Artigas, Felix Freitag, and Luís Veiga. "Practical service placement approach for microservices architecture." In 2017 17th IEEE/ACM International Symposium on Cluster, Cloud and Grid Computing (CCGRID), pp. 401-410. IEEE, 2017.

Singleton, Andy. "The economics of microservices." IEEE Cloud Computing 3, no. 5 (2016): 16-20.

Sun, Long, Yan Li, and Raheel Ahmed Memon. "An open IoT framework based on microservices architecture." China Communications 14, no. 2 (2017): 154-162.

Taherizadeh, Salman, Vlado Stankovski, and Marko Grobelnik. "A capillary computing architecture for dynamic Internet of things: Orchestration of microservices from edge devices to fog and cloud providers." Sensors 18, no. 9 (2018): 2938.

Taneja, Mohit, Nikita Jalodia, John Byabazaire, Alan Davy, and Cristian Olariu. "SmartHerd management: A microservices-based fog computing-assisted IoT platform towards data-driven smart dairy farming." Software: practice and experience 49, no. 7 (2019): 1055-1078.

Waseem, Muhammad, Peng Liang, and Mojtaba Shahin. "A systematic mapping study on microservices architecture in devops." Journal of Systems and Software 170 (2020): 110798.

Whaiduzzaman, Md, Alistair Barros, Ahmedur Rahman Shovon, Md Razon Hossain, and Colin Fidge. "A Resilient Fog-IoT Framework for Seamless Microservice Execution." In 2021 IEEE International Conference on Services Computing (SCC), pp. 213-221. IEEE, 2021.

Whaiduzzaman, Md, Md Julkar Nayeen Mahi, Alistair Barros, Md Ibrahim Khalil, Colin Fidge, and Rajkumar Buyya. "BFIM: Performance Measurement of a Blockchain Based Hierarchical Tree Layered Fog-IoT Microservice Architecture." IEEE Access 9 (2021): 106655-106674.

Xu, Ronghua, Seyed Yahya Nikouei, Yu Chen, Erik Blasch, and Alexander Aved. "Blendmas: A blockchain-enabled decentralized microservices architecture for smart public safety." In 2019 IEEE International Conference on Blockchain (Blockchain), pp. 564-571. IEEE, 2019.

I-ViSE Scheme Overview

I-ViSE uses video query for smart urban surveillance. The first step toward understanding of the video data begins with object detection and classification of pictures. Visual data querying uses the deep learning models to classify specific objects in frames with bounding boxes. The I-ViSE enables the security officers to conduct real-time search in a large-scale smart surveillance system based on high-level, not-so accurate descriptions on the object of interest. For instance, the phrases like red hat, blue jeans are normally applicable as the keys and the I-ViSE system returns the matches with geolocation associated with the cameras.

Hierarchical Platform

FIG. 1 presents the layered architecture of the proposed I-ViSE system that follows the edge-fog-cloud computing paradigm. At the edge, smart cameras are deployed to collect video streams and conduct pre-processing for object detection and feature extraction. Due to its limited computing capability, more complex tasks are deployed on the fog layer. Each fog node communicates and manages several edge devices. Normally, fog nodes are allocated that are close to the geolocation of the associated edge nodes. Meanwhile, fog nodes communicate with the cloud node, accepting dispatched queries.

Due to the attractive features of low cost, small energy consumption, and reasonable computing power; the edge nodes of the I-ViSE system are smart cameras built with the Single Board Computers (SBC), such as Raspberry Pi Model 3 series or Model 4 series. With a good tradeoff between the computing power and energy utility, the edge nodes accommodate microservices that execute video pre-processing and feature extracting tasks. Meanwhile, the fog nodes are expected to be capable of maintaining the throughput required as a middle node. The Fog node may be a tablet or a laptop that is deployed close to the locations of the smart cameras. For instance, the laptop carried on the patrolling vehicle driven by a security officer. The cloud center has connection to all of the edge and fog nodes in the network and can access any device when needed. Human operators can issue queries to all the fog nodes from the cloud center.

The microservices architecture is realized through docker image implementation, which is selected because of many advantages. The docker system is easy to use and it's availability through the cloud connection supports convenient interaction, efficient fetching, and pre-built image processing. Two docker container images are built for the I-ViSE platform, one for the edge nodes and the other for the fog nodes, each running a webservice through the Python's Flask web-framework.

Security is derived from protection from attack over hardware, software, and data. While current studies assume robustness from security, future work with leverage (1) software security: authentication and access control, (2) hardware security: temper evident platforms based on the blockchain ledger, and (3) data security: context-driven situation awareness in which context features are checked to determine the pragmatic results for consistency.

Working Flow

As illustrated in FIG. 1, the edge hierarchy is adopted to connect a huge number of cameras into a tree-based graph to fog nodes, which are in charge of the request handling. The model has several advantages such as good scalability, easy updates, and management when needed. This flexible platform architecture can easily handle more cameras when more edge and fog nodes are added in future deployments.

Figure 2:
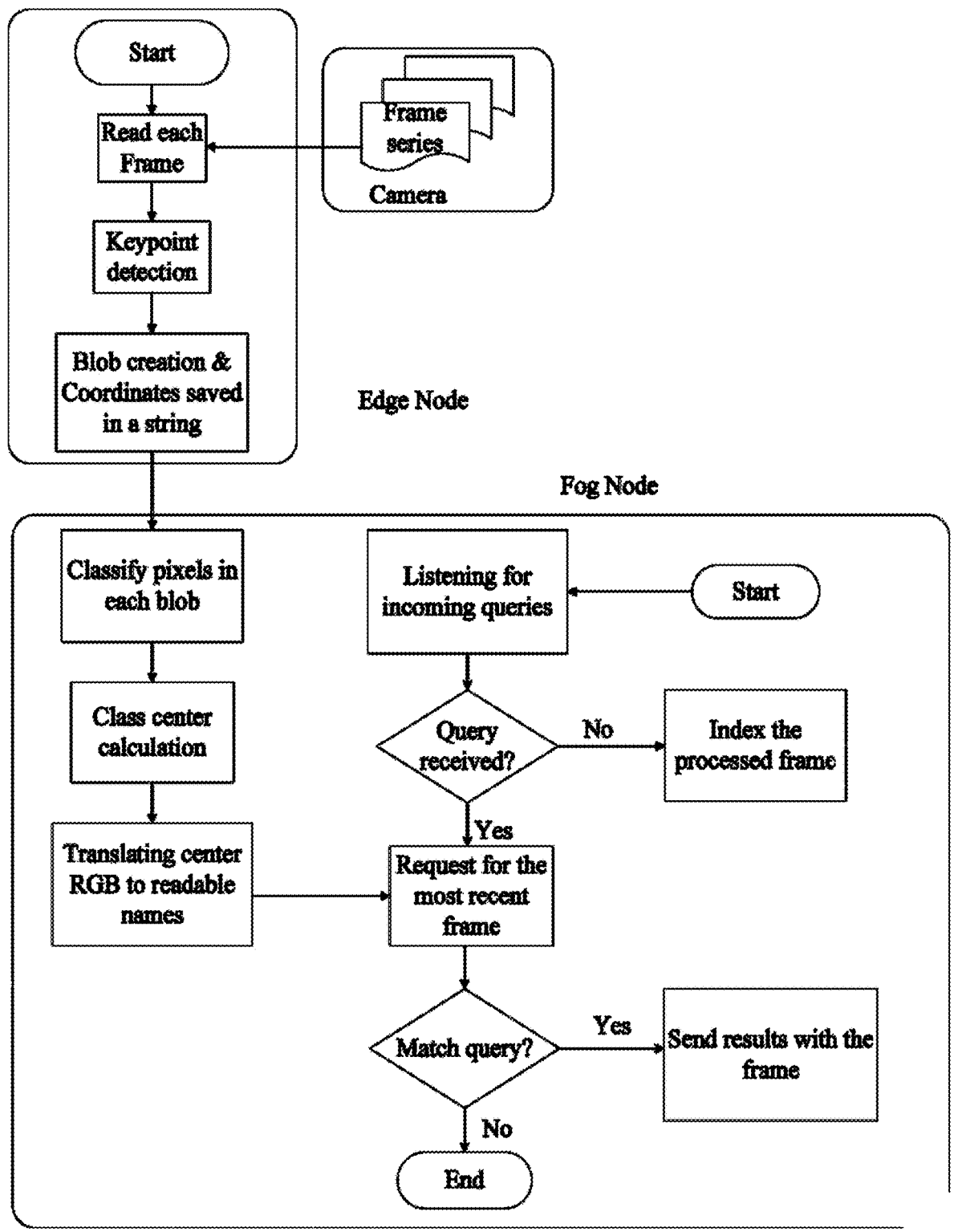
FIG. 2 shows a Data Flow Flowchart of the proposed decentralized video query, according to embodiments of the disclosure.

FIG. 2 shows the workflow of proposed I-ViSE scheme. Once a video frame is captured by the camera, it is streamed to the SBC on-site in the edge node. The SBC accepts every frame from the camera and marks it for either omitting or processing. On receiving a query from the fog or cloud layer, the edge device starts processing the current video frames. According to the keywords provided in the query, the edge node will detect whether or not there is an object of interest in the frames. If the object is detected, the keypoints of the human body and the corresponding colors in the key regions are extracted and sent to the fog node. The query-matching is conducted at the fog node as the edge device cannot handle the computing-intensive task. If there is a match, the fog node reports the results to the operator, including the frame time, the camera ID and the location.

Frame Preprocessing at the Edge

On-site processing at the edge is the most ideal solution. The video frames are processed immediately once they are collected by the camera, minimizing the communication overhead incurred by the raw video transmission through the network. Although the query is initialized from the operator through the cloud and fog nodes, most of the raw footage data is not relevant. Actually, the useful information can be delivered back to the node that initiated the query using a small amount of bytes, which results from the deep model feature extraction and object of interest cropped frame sections.

The fog node handles the query matching and video retrieval. The results are then reported back to the operator along with the ID of the camera with the detected objects. An unsupervised classification model gives the center of the pixel values containing the sections of interest and the center is translated to human readable color names before report generation at the fog. The matching process is a computing intensive task accomplished by the fog node reducing the communication traffic and removing the dependence on the remote cloud node.

A real-time human pose estimation model, which is based on the OpenPose in the TensorFlow framework (for more information on the accuracy measurements of OpenPose deep model) is adopted. Z. Cao, T. Simon, S.-E. Wei, and Y. Sheikh, "Realtime multi-person 2d pose estimation using part affinity fields," in Proceedings of the IEEE Conference on Computer Vision and Pattern Recognition, 2017, pp. 7291-7299.

As illustrated by FIG. 2, the edge node feeds the video frames to the Open Pose model to get the human key points. The DNN model is trained on COCO data set with more than 64,000 images for 2D pose estimation. The OpenPose model is available by IBM, deployed in a docker container. The container removes the need for environment preparations and may receive the frame through the open port. By the implementation of the post-processing, the results are in the format of a string for each frame. On the output of the model, there are two branches; one to give the confidence score in the body-joint being predicted and the part affinity fields for parts association. Each branch has multiple stages of convolutional layers providing a feature map. At the end of each stage the results in the feature map produced in confidence branch is summed up with the resulting feature map from the part affinity fields.

The part affinity fields present a gradient for each pixel on the human body along and close to the line connecting two body points. The ground truth for $L^*_{c,k}(p)$, which is a unit vector that points from one body part to the other along a limb, is described as Eq. (1):

$$L^*_{c,k}(p) = \begin{cases} v & \text{if } p \text{ on limb } c, k \\ 0 & \text{Otherwise} \end{cases} \quad (1)$$

where v is the unit vector as defined by Eq. (2):

$$v = \frac{(x_{j2,k} - x_{j1,k})}{\|x_{j2,k} - x_{j1,k}\|_2} \quad (2)$$

where the points $X_{j2,k}$ and $x_{j1,k}$ represent the limb c of the person k. Each point p is a pixel that may be along the limb or not represented by $L^*_{c,k}(p)$. The threshold showing if the designated point p is placed on a certain limb c is given as:

$$0 \leq v \cdot (p - x_{j1,k}) \leq l_{c,k}$$

$$0 \leq v_\perp \cdot (p - x_{j1,k}) \leq \delta_{c,k} \quad (3)$$

here the limb width is $\delta_{c,k}$ and the limb length is $l_{c,k}$.

In this button-up approach, post processing is required after the model gives the results so that the points are grouped for each human. This task is done through grouping the points based on connection between them and the direction of the connection link between each pair of keypoints. The model has 75.6 mean-Average Precision on the COCO test data improving the accuracy of the human gesture estimation in comparison with other models. The approach demonstrates moderate, but manageable, resource consumption on a Raspberry Pi Model 4 board.

Figure 3:
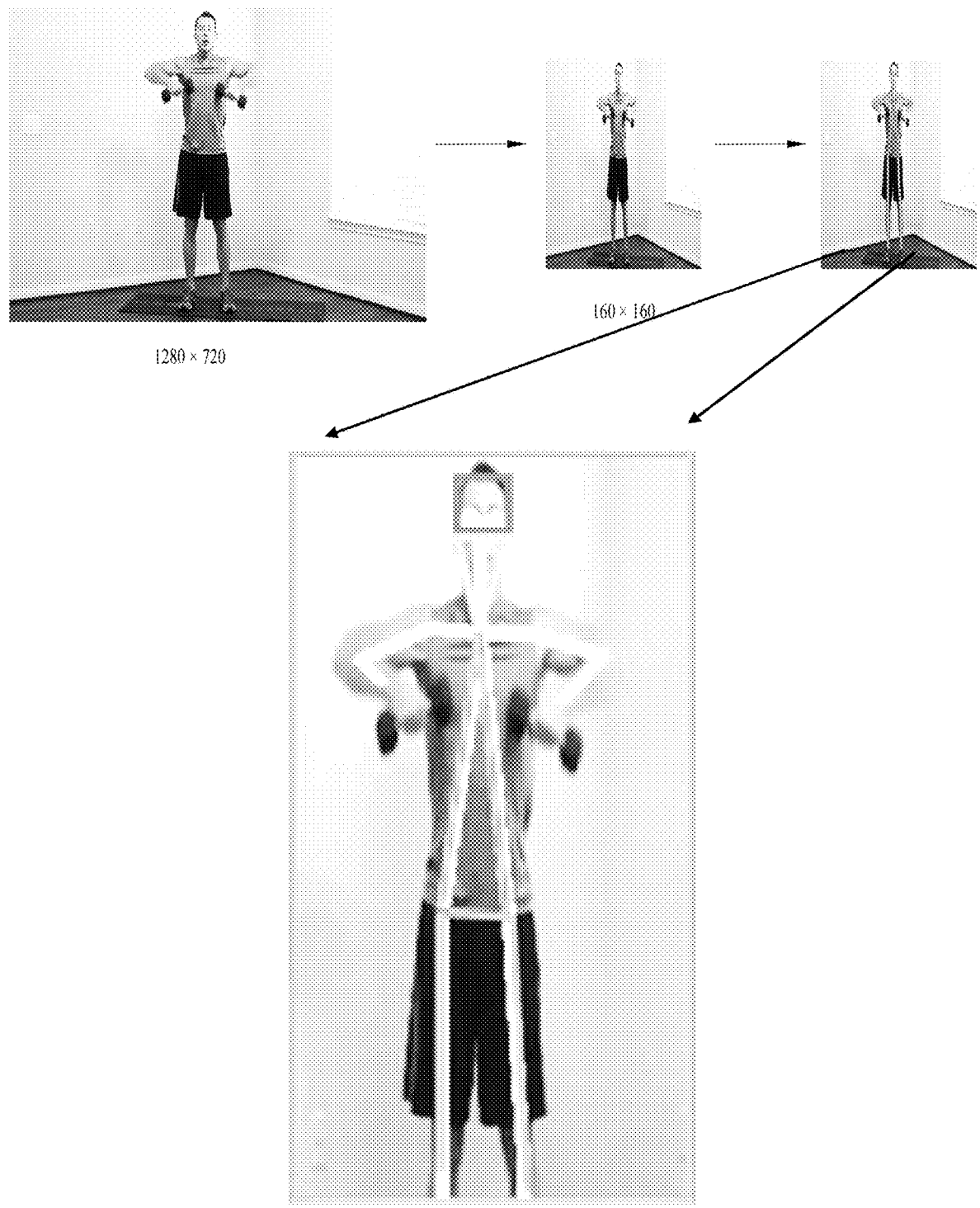
FIG. 3 shows image resize and keypoint detection—these keypoints are used for part extraction and color detection, according to embodiments of the disclosure.

FIG. 3 shows a sample image that is processed using the DNN model. In FIG. 3, after the frame is captured, the service at the edge node implements frame resizing since 160×160 is the accepted image size which can be fed to this DNN model. Also some other filters smooth the image and reduce noise. These steps improve the accuracy of the DNN model for human keypoint detection. The image in the middle of FIG. 3 shows the frame after initial pre-processing. The frame is then processed using another docker container with the DNN implementation. The text results can be shown on the image in form of lines and keypoints as the green lines on the far-right section of that figure. The position of the keypoints are of importance to conduct highlighted portions of body for color detection purposes.

One downside to using docker is that the operating system limits the docker containers to prevent system crash, which in return in a smaller device such as the edge node, the execution takes even longer. However, the modular capability that the docker containers provide is aligned with the microservices architecture making scaling easier.

The last step conducted by the edge device is to crop the areas of interest. If $H_{f,c,l}$ shows the point of left hip of the person c in frame sequence f, and $H_{f,c,r}$ shows the right hip, connecting them to the lower part of the neck, $N_{f,c}$, a triangle is shaped, which shows the majority of the upper body of the object and can be used for the color of shirt. The next two important keypoints are the ones of knees named $K_{f,c,l}$ and $K_{f,c,r}$. Connecting them to the corresponding left and right hip points results in two lines along the legs of the object in an array of pixels along the path, which can be used for detection of the color of the pants. The Open Pose model similarly gives $E_{f,c,l}$ and $E_{f,c,r}$, which are the left and right ears. Ears connected to the neck point, gives another triangle. This triangle provides the pixels which are mostly in the face area. Considering the human head to fit in a square, the distance between the ears will create that square. Thus the points of interest in each human are $$W = (H_{f,c,l}, H_{f,c,r}, K_{f,c,l}, K_{f,c,r}, E_{f,c,l}, E_{f,c,r}, N_{f,c}).$$

These sections for each human body in the video frame are fed to the query matching algorithm conducted at the fog nodes. Through an unsupervised k-Nearest-Neighbors (kNN) classification algorithm, the color names presented by the pixel values are extracted and the center of the pixels is accurately obtained. Through classifying the pixel density values for each RGB channel, the expected number of the colors are estimated. The output from each batch of edge devices are sent to a fog node along with the areas of interest, where the query matching procedure will be completed and the results will be reported to the operator.

Unsupervised Query Matching

Figure 4:
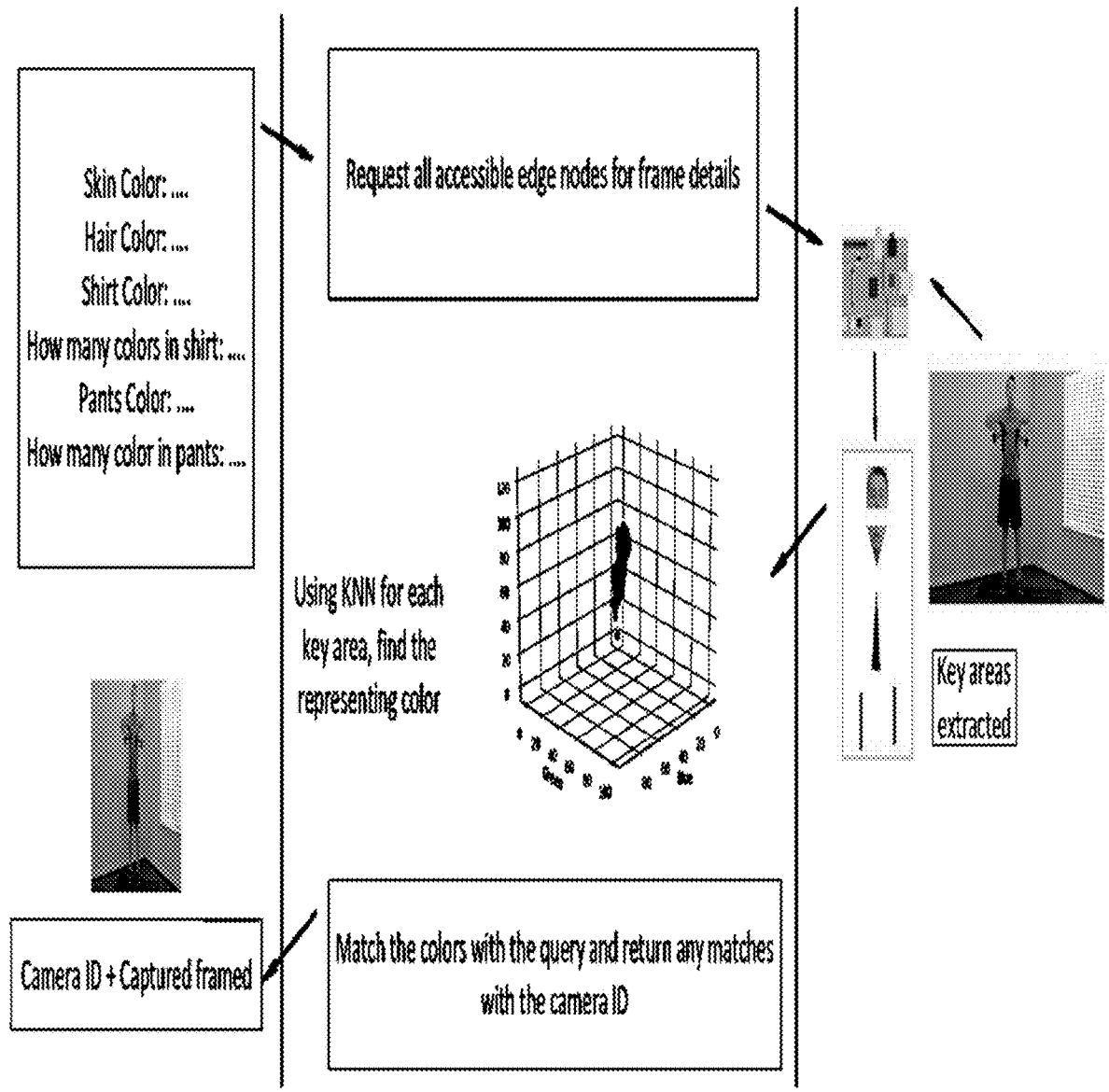
FIG. 4 shows steps and the working flow of the unsupervised query matching algorithm of I-ViSE, according to embodiments of the disclosure.

FIG. 4 shows the steps and working flow of the unsupervised query matching algorithm of the I-ViSE scheme.

Before the search starts, the algorithm receives a string query with a unique structure from the user. The user submits the query through a cloud node or a fog node, which will communicate with the corresponding edge nodes. The user needs to enter the information they are looking for, such as the number of the colors they are after in each section of the body. For example, the input from the user can be "blue jeans", "red hat", "grey T-shirt", etc. This prevents the user to have access to the public information before having specific description of the person of interest. Grouping pixel values helps with the unsupervised pixel classification, given the number of colors to be expected in each body section.

The fog node then sends a request to all of the edge nodes that it connects to in order to process the most recent frame that is captured by the camera in an area. On receiving the request from the fog node, the edge nodes feed this frame to its pre-trained DNN, which gives a string showing each of the identifiable people in the frame as well as all of the body joints and their connections. These connections are useful for human pose detection along with the body skeleton. In the non-limiting examples discussed herein, these points are leveraged to capture parts of the body and face to allocate the colors the query is interested in.

Each of the edge nodes sends the body part sections back to the fog node, where all received sections are analyzed. The pixels are translated into a color that can be used to match with the description given by the query. This function is accomplished through a combination of a kNN algorithm and a hash-map data structure.

Each part of the detected human body, as shown in the green rectangle in FIG. 4, is fed to a kNN to identify the color they present. Pixel values are the kNN features. The number of neighborhoods is given by the user for the shirt and pants color implemented with one neighborhood for the face color and one for the hair color. FIG. 4 shows the pixel values for the grey shirt the person in the sample image is wearing. The kNN clustering representation clearly shows the pixels scattering in the body blob of the sample image. Estimating the number of neighborhoods also helps with the noise reduction such as removing a shadow line across the body from which those pixels are considered as outliers and may not change the neighborhood center.

The center of each neighborhood is the mean of data distribution corresponding to the body section reported in the RGB format. In order for the fog node to compare the results with the query, the last step is to translate the center values to a color name. The colors of the shirt and pants are translated through a 24 hash-map color dictionary where the pixel ranges are mapped to a color names. More detailed names are rarely used in police reports and general colors such as "red" or "blue" covers a variety of colors. This generalization also reduces the error due to the noise or other light elements that may present a color slightly different. The results are then presented to the operator who can make a final decision. The color map for the face and hair are simple such as "white" and "black" to present the skin color and "black", "brown", "blond", "red" and "other" to represent the hair colors.

Finally, the fog node compares the descriptions in the query from the operator to the results of the colors. In case of a match, the frame sequence and the camera ID along with the frame are sent back to the operator.

The search uncertainty comes from the fact that the DNN model may fail to detect every human and every keypoint in the frame. In case of a missing keypoint, the suspected contour could not be defined and consequently the color of the part could not be retrieved. The model is trained to predict the position of the keypoints. However, the keypoints may not be the output if the object of interest (human) has a sharp angle towards the camera.

Figure 5:
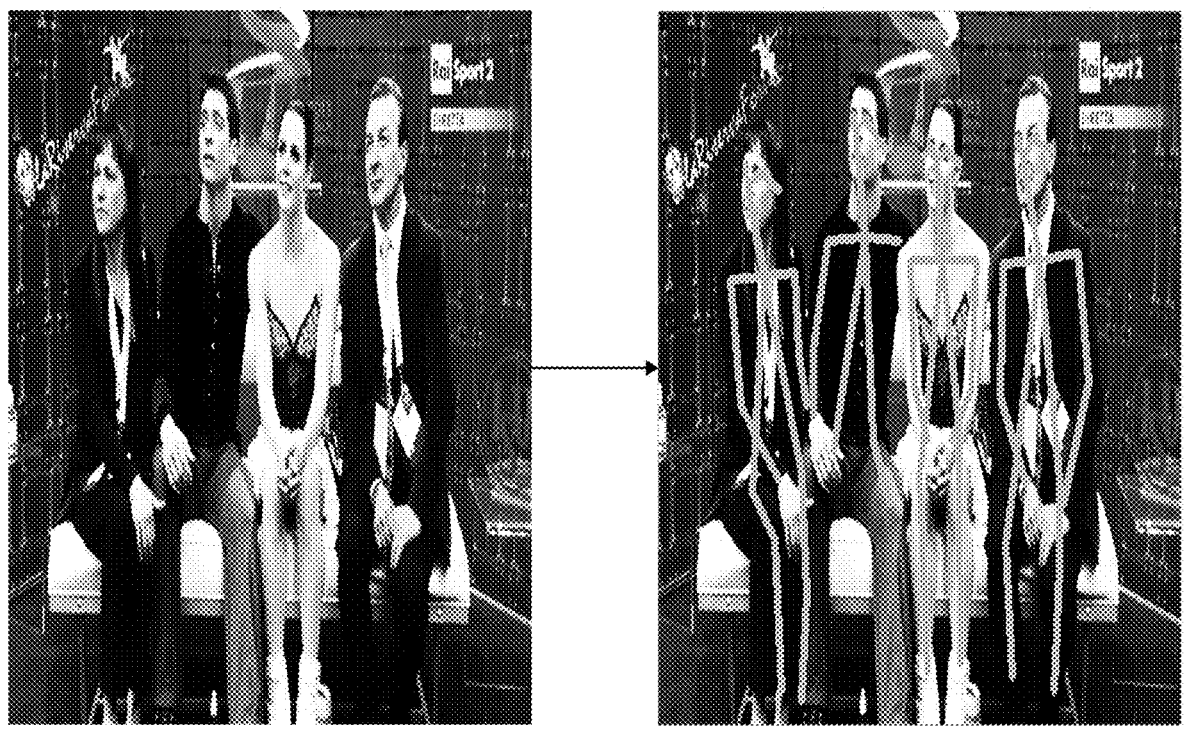
FIG. 5 shows sample image where the detection CNN misses some parts of some objects of interest, according to embodiments of the disclosure.

FIG. 5 shows some scenarios where the detection failed. In FIG. 5 four people are sitting next to each other. The algorithm is confused about the right-hand side male's left leg and classified it as the far-right lady's right leg. Moreover, the algorithm failed to classify the ears which are not visible from this camera angle. Readers interested in more detailed information are referred to.

Experimental Results

The accuracy of the I-ViSE scheme is determined by the accuracy of the CNN adopted for object detection. Table I compares the accuracy of our CNN model with two other state-of-the-art models on the MPII human keypoint detection test. In this work, the CNN model is applied directly as it was represented by without making changes in the architecture. Actually, change in the model for faster inference leads to a lower accuracy, which is not an ideal trade-off.

TABLE I

Implemented model for human keypoint extraction accuracy compared to other DL models.

| Architecture | Head | Sho | Elb | Wri | Hip | mAP |
| --- | --- | --- | --- | --- | --- | --- |
| DeeperCut [14] | 78.4 | 72.5 | 60.2 | 51.0 | 57.2 | 59.5% |
| Iqbal et al. [15] | 58.4 | 53.9 | 44.5 | 35.0 | 42.2 | 43.1% |
| I-ViSE | 91.2 | 87.6 | 77.7 | 66.8 | 75.4 | 75.6% |

The experimental study has verified there is not any degradation introduced in the query processing flow. Therefore, the experimental results reported focus on the performance metrics in terms of frame processing speed and utility of computing and communication resources.

Experimental Setup

The edge architecture used in the non-limiting examples discussed herein is based on the recent movement towards decentralized computing that has its challenges and benefits. The architecture eliminated the need of upstream raw video data from the sensor to the cloud while giving the ability to control the system from different access points.

As mentioned earlier, Raspberry Pi model 4B is adopted as the edge node running Raspbian (Buster) operating system. It includes 4 GB LPDDR4-3200 SDRAM and a Broadcom BCM2711, Quad core Cortex-A72 (ARM v8) 64-bit SoC @ 1.5 GHz chip. The cameras are Logitech 1080p with 60 frames per second connected to the USB port of the Raspberry Pi boards.

The fog node is a laptop PC running Ubuntu 16.04 operating system. The PC has a 7th generation Intel core i7 processor @3.1 GHz and 32 GB of RAM. The wireless connection between the fog and edge is through wireless local area network (WLAN) with 100 Mbps.

The operator can send query through the TCP/IP protocol and is considered to be using the same fog node. Each edge module is handled with a CPU core on the fog (single threaded execution), so that more edge boards can be connected at the same time. Other resource managing software also may be used on top of the platform for better resource management.

Color Matching Performance

The unsupervised approach for color detection on the regions of interest is limited to the color shifting phenomenon that are usual in cameras such as environment lightning, camera accuracy, and added noise. There is no public dataset that tackles these shifts and provides a metric for comparison of approaches.

Figure 6:
FIG. 6 shows sample image where three ladies are under direct sun light and the sun light from behind, according to embodiments of the disclosure.

FIG. 6 shows a scenario where people are in shadow or under the direct sunshine. The color of the shirt is brighter but still be recognized as the same color. For example, the skirt of the lady in the middle is identified as purple because there is no dark or light purple in the classification, both are classified as the same color. There may be a need for a dataset that includes all possible challenges that might be feasible.

However, generalization of color based on only several dominant colors as illustrated by FIG. 7 makes the search for queries more feasible and practical. Considering the effects of the sun light on the image analysis, the values are rounded to the closest names for presentation.

Figure 8:
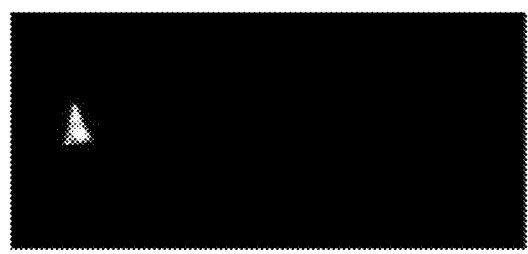
FIG. 8 shows dress color detection of the ladies in FIG. 6. Center 1: the detection under direct sunlight, Center 2: the case when sunlight from the back, according to embodiments of the disclosure.
Figure 8:
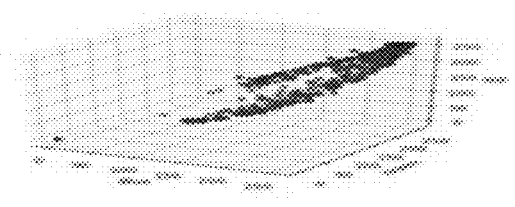
Figure 8:
Figure 8:
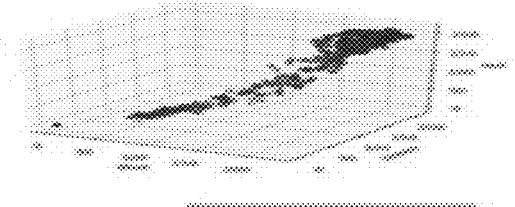
Figure 8:
Figure 8:
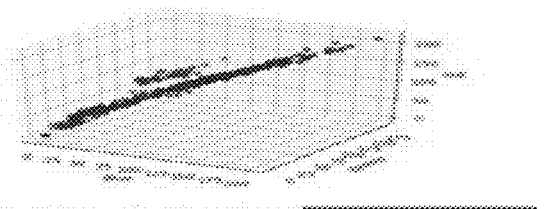
Figure 8:
Figure 8:
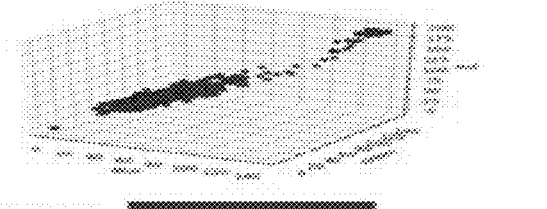
Figure 8:
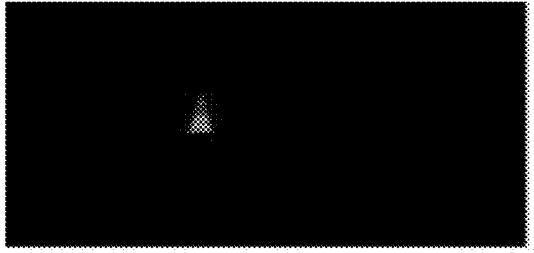
Figure 8:
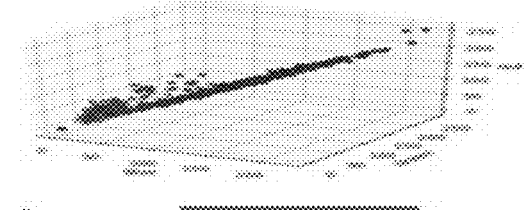
Figure 8:
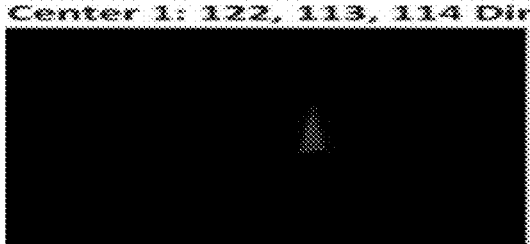
Figure 8:
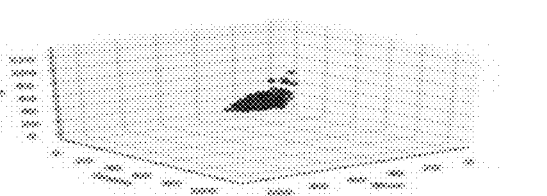

FIG. 8 illustrates the detection results of the example shown in FIG. 6. Decimal codes obtained for each object in the example are presented along with the detection results. Meanwhile, in cases where some dresses are having multiple colors and having the wrong number of classes, it is expected to amalgamate those colors and give a mixture of them. A phenomenon that in some cases may lead to new diverged values. The agent in these cases may need to review the results.

Performance Evaluation

1) Preprocessing at the Edge: To support real-time, online queries, the most critical link in the information processing chain is the delay incurred at the edge nodes where the frames are processed for key points of the objects.

Figure 9:
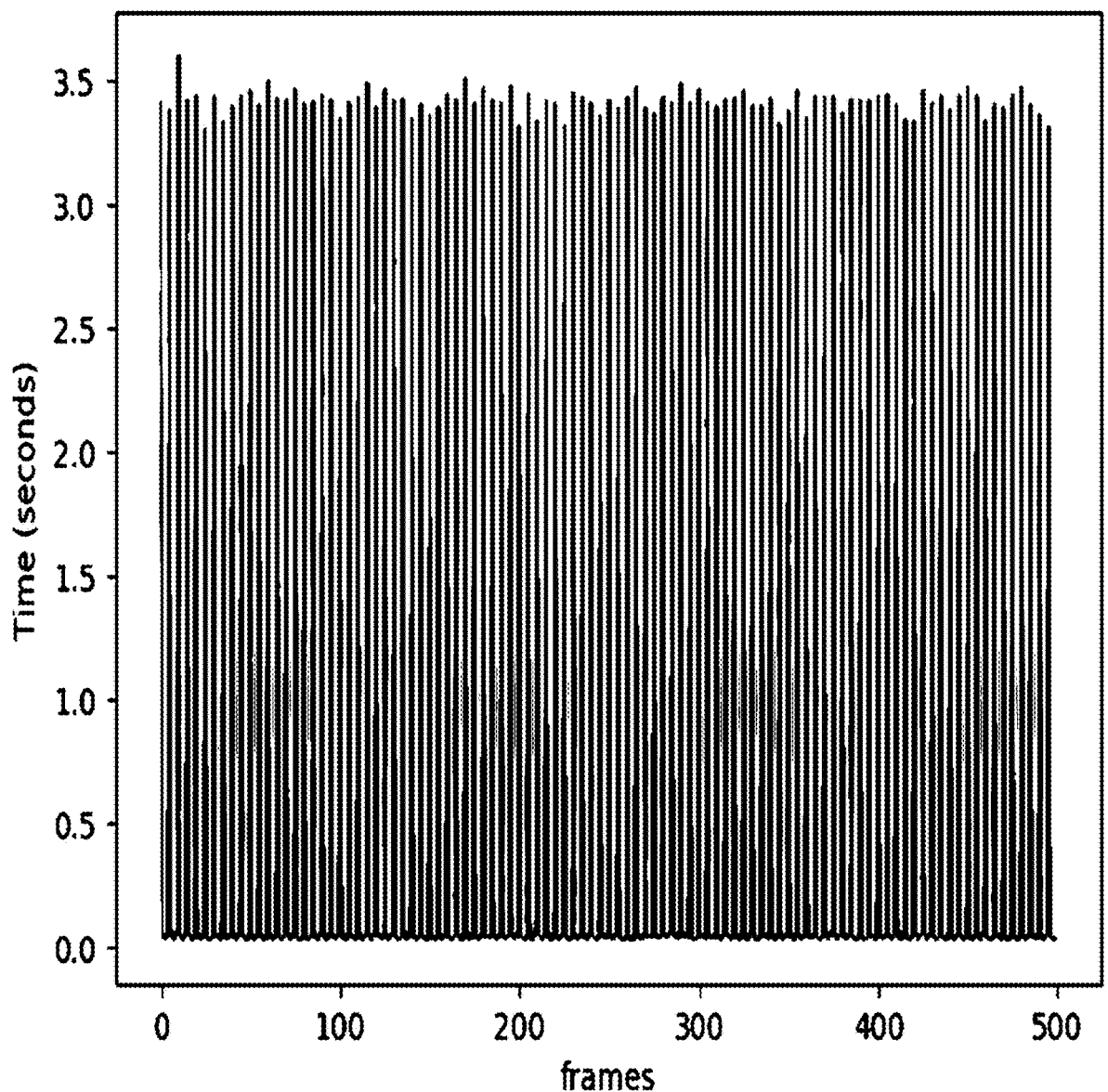
FIG. 9 shows frame processing delays at the edge, according to embodiments of the disclosure.

FIG. 9 shows the delays measured at the edge nodes. FIG. 9 presents a scenario in which there are four people in the frame. Considering the frame-drop rate of 50% and the average presence of one objects in each frame, the edge nodes can process 1.4 frames per seconds with frames of 1080p resolution.

Figure 10:
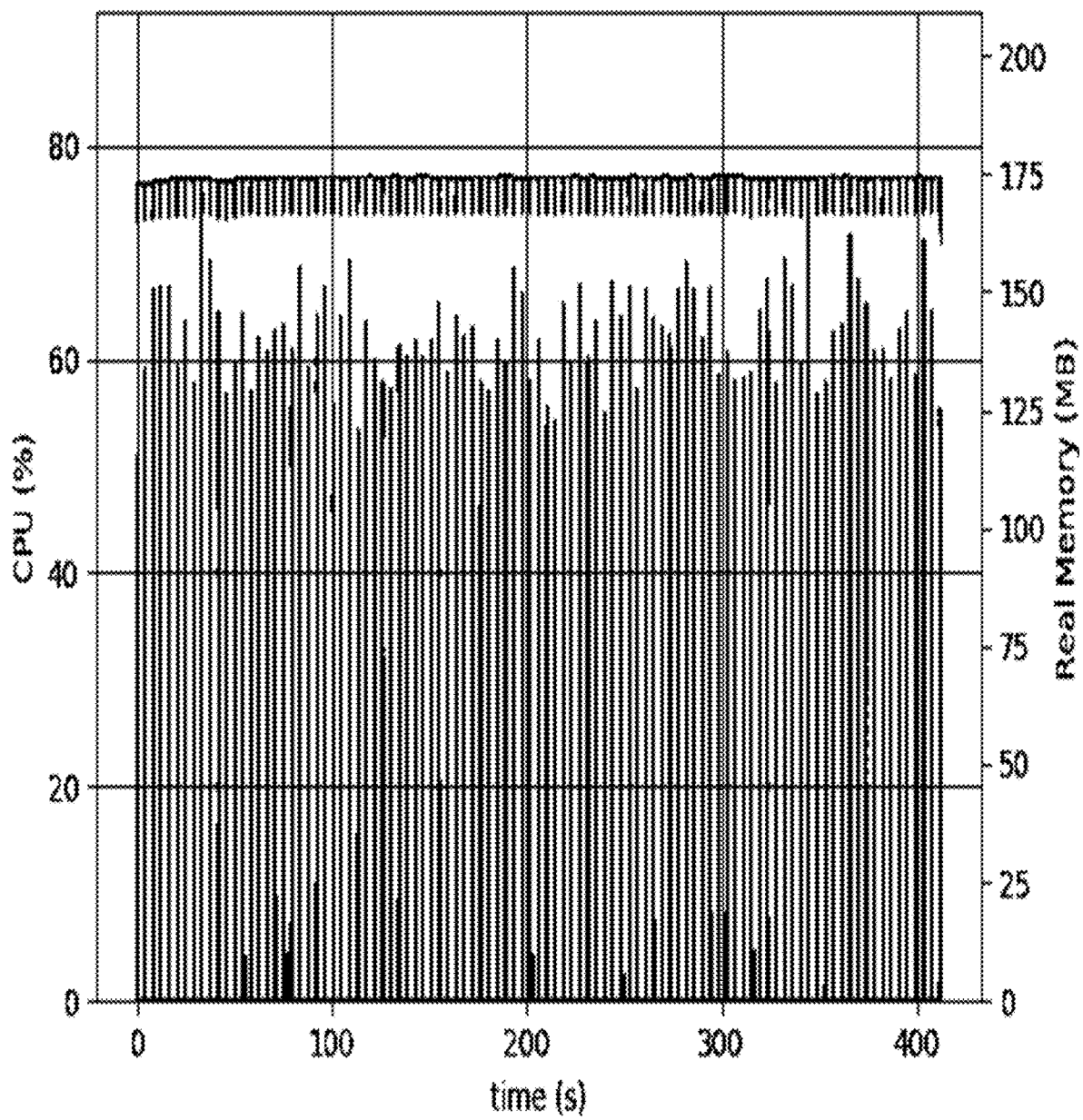
FIG. 10 shows memory and CPU usage of the edge node (Raspberry PI 4B), according to embodiments of the disclosure.

FIG. 10 presents the central processing unit (CPU) and memory utility for processing about 400 seconds long section of a video by an edge node, a Raspberry Pi 4B device, which shows a burst usage pattern in the memory and CPU when the convolutional neural network (CNN) is being executed. This measurement has been recorded using top function in Ubuntu to record the CPU and memory monitor for each process. The use of 175 MB of the memory and the 80% CPU gives confidence in the use of a resource constrained Raspberry Pi as the edge device to fulfill the needs of the I-ViSE scheme. 80% CPU utilization also validates the design that allocates the query matching procedure on the fog side.

2) Load on the Communication Network: Instead of outsourcing the raw video to the fog node, the I-ViSE edge devices only send the string along with image blobs that can be used by the classifier. If the frame does not include any object of interest, there is no need to transfer any information. This strategy is beneficiary to the communication network.

Figure 11:
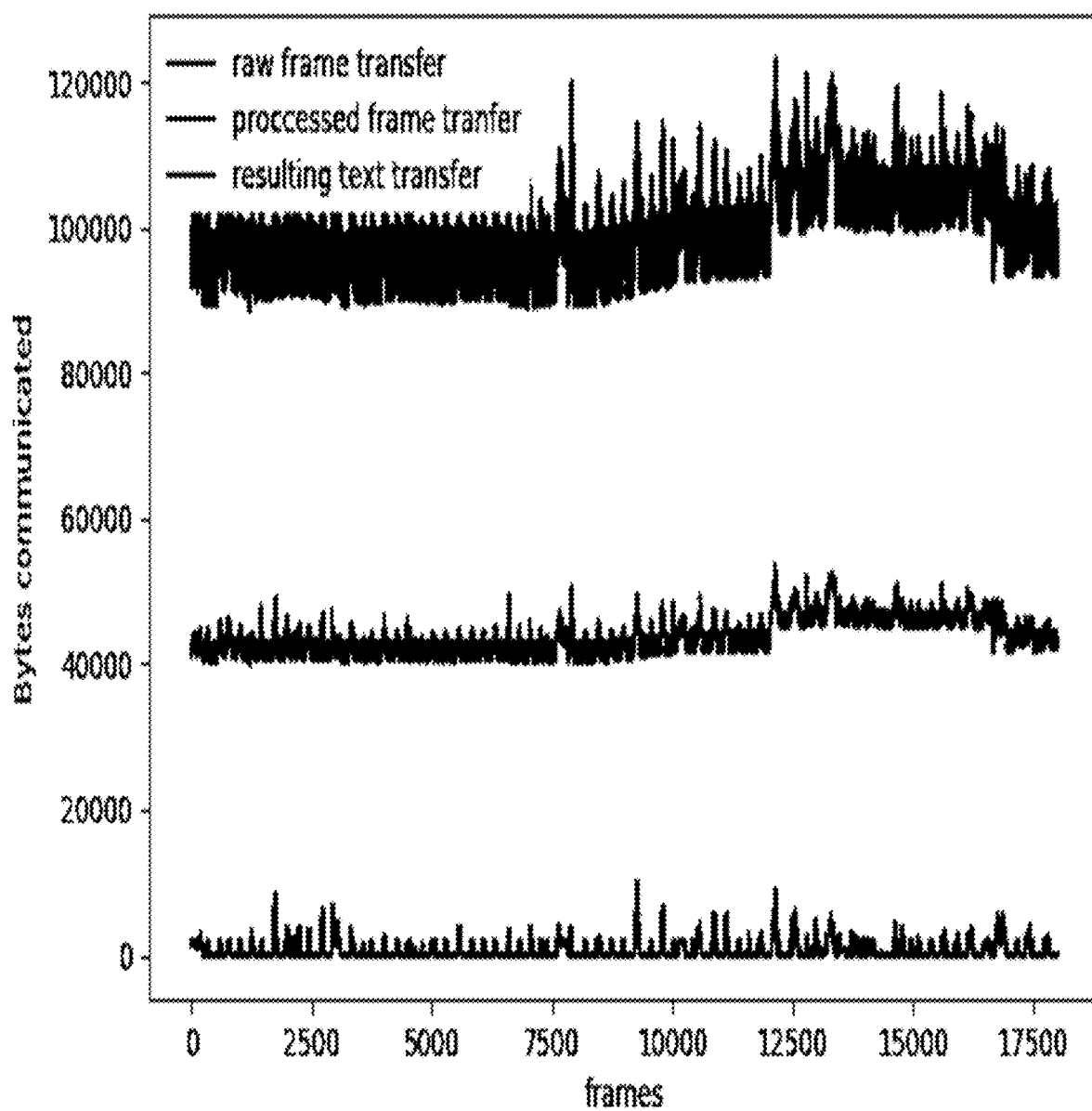
FIG. 11 shows bytes sent in raw video versus sending the features and frame blobs after processing at the edge, according to embodiments of the disclosure.

FIG. 11 shows the gain in workload. It compares the transmission of the whole frame versus the transmission of the data extracted in a hundred frames period. It shows the instances where there is at least one person visible in the frame, which suggests an even lower average in the overall communication traffic. FIG. 11 shows that the traffic is reduced from an average of about 100 KB to about 45 KB with a 55% reduction in the network traffic resulting from the edge computation.

3) Query Processing at the Fog: The experimental results verified that the fog nodes have sufficient capability to handle the query after the results are taken from the edge.

Figure 12:
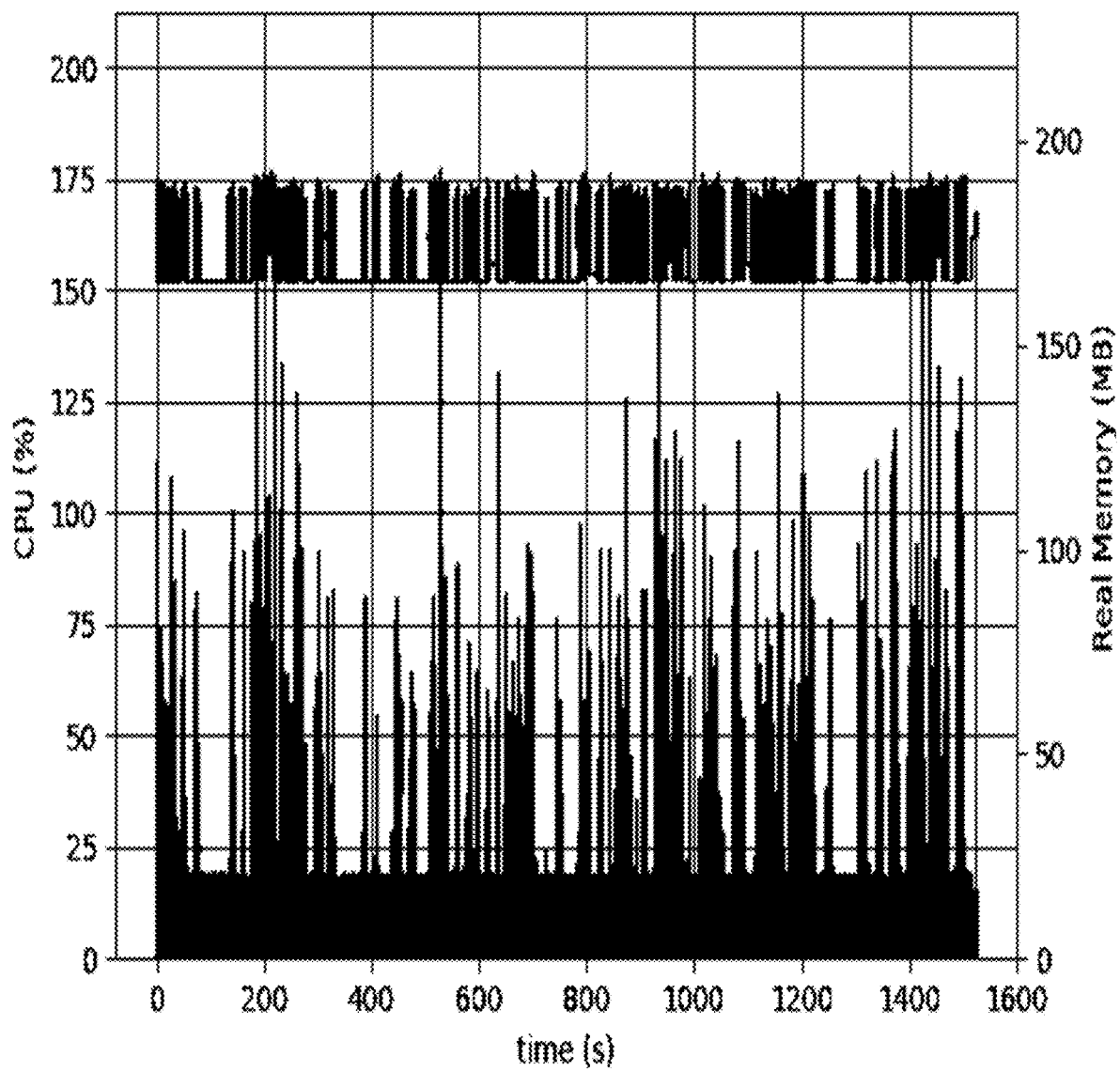
FIG. 12 shows CPU and memory usage of the fog node while processing the feed from one camera on a single thread (Overclocking from the based CPU speed is shown to be higher than 100%), according to embodiments of the disclosure.

FIG. 12 shows the memory and CPU usage in query processing for a period of almost a thousand seconds. FIG. 12 is generated using the data available through the top application in Unix for system monitoring purposes and recorded through PSrecord (same as the edge node).

Figure 13:
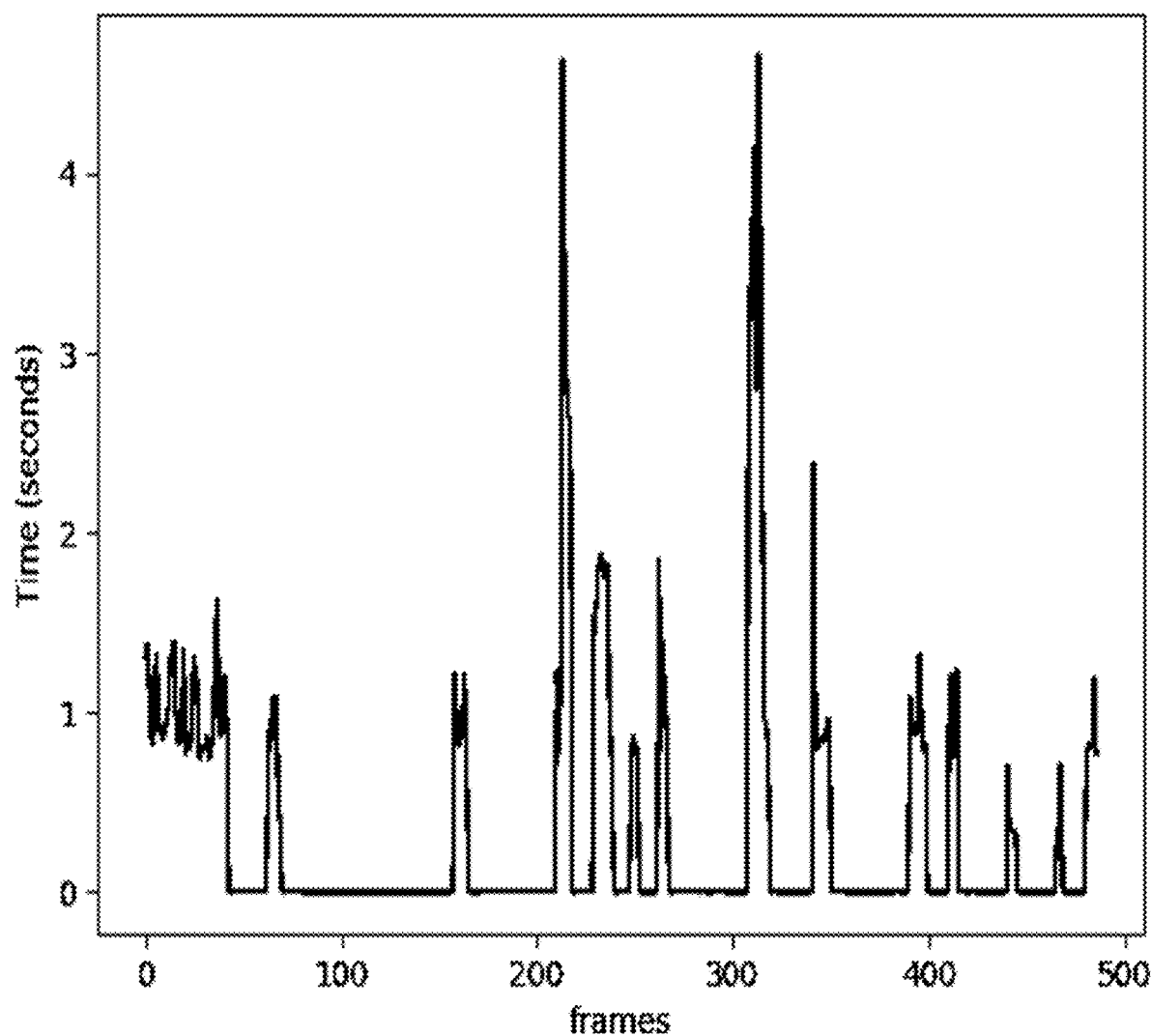
FIG. 13 shows time required to process each frame at the fog node on single thread, according to embodiments of the disclosure.

Moreover, the time needed in the fog node to process a single frame for a period of run-time is given in FIG. 13.

Notice that the data shown in FIG. 13 are after the edge has finished the frame preprocessing, so there is no delay related to the fog node waiting for the new information. There are several spikes in the processing time corresponding to the number of people in the frame. Such that as the number increases the algorithm requires more time to search and match for each object. The pixel evaluation algorithm takes about 0.9 seconds to classify and translate the pixel values to human readable names and stack it up for a given object on the fog node utilized in this study on a single thread.

Discussion

As illustrated by the data flow in FIG. 2, the query and search processes in the I-ViSE model does not aim at any specific human object in the video frames. Even in a case that an officer searches for a specific target, the model does not reveal any data about the face or clothing type of the object. The data in categorized is based on the color of the shirt, hat, or/and hair. There is not a video frame or image to be outsourced to the data center. Therefore, by design the I-ViSE scheme protects the privacy of the pedestrians who are walking in front of the cameras while provides law enforcement agents the capability to effectively search for a suspect. The I-ViSE scheme does not introduce bias towards any group or ethnicity, as the KNN model is not given a knowledge of the person of interest. The CNN is pre-trained to extract feature artifacts related to the human body and does not provide further information regarding the identification of the subject.

The non-limiting examples discussed herein present a novel method for human objects search in real-time leveraging the state-of-the-art CNN model as well as several other components.

CONCLUSION

The non-limiting examples discussed herein propose a unique searching algorithm for video querying using a DNN that has the potential of being deployed on the edge architecture. Using the microservices scheme, the proposed I-ViSE platform is divided to simple tasks to reduce communications, improve accuracy, and provide real-time performance. The I-ViSE system is capable of reading real-time video frames and performing the search for a query entry in average of two seconds. I-ViSE also has the capability to create an index table on the fog device for future searches. The platform allows the operator to search through the large-scale smart surveillance system video archive with high-level, subjective descriptions, such as the color of clothes or the hair of a human. Through a proof-of-concept prototype utilizing a Raspberry Pi as the edge device, the I-ViSE scheme is validated that achieves the design goals.

The I-ViSE is highlighted for man-machine surveillance based on an assumption that the imagery being processed has undergone "interpretability" scores to ensure that the images processed contain meaningful content and image quality. The sensor (noise), environment (illumination, weather), and target (movements) influence the performance while the image quality is related to the processing, geometry, and effects. These conditions were held constant in the collections to focus on timeliness. Future studies will show the variations in performance relative to these variations.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As discussed herein, various systems and components are described as "obtaining" data (e.g., Example, etc.). It is understood that the corresponding data can be obtained using any solution. For example, the corresponding system/component can generate and/or be used to generate the data, retrieve the data from one or more data stores (e.g., a database), receive the data from another system/component, and/or the like. When the data is not generated by the particular system/component, it is understood that another system/component can be implemented apart from the system/component shown, which generates the data and provides it to the system/component and/or stores the data for access by the system/component.

The foregoing drawings show some of the processing associated according to several embodiments of this disclosure. In this regard, each drawing or block within a flow diagram of the drawings represents a process associated with embodiments of the method described. It should also be noted that in some alternative implementations, the acts noted in the drawings or blocks may occur out of the order noted in the figure or, for example, may in fact be executed substantially concurrently or in the reverse order, depending upon the act involved. Also, one of ordinary skill in the art will recognize that additional blocks that describe the processing may be added.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

REFERENCES

Nikouei et al., "I-Vise: Interactive Video Surveillance as an Edge Service using Unsupervised Feature Queries," the Institute of Electrical and Electronics Engineers (IEEE) Aug. 14, 2020 (ieeexplore.ieee.org/document/9167223).

G. Ananthanarayanan, P. Bahl, P. Bodík, K. Chintalapudi, M. Philipose,

L. Ravindranath, and S. Sinha, "Real-time video analytics: The killer app for edge computing," computer, vol. 50, no. 10, pp. 58-67, 2017.

Z. Cao, G. Hidalgo, T. Simon, S.-E. Wei, and Y. Sheikh, "Openpose: realtime multi-person 2d pose estimation using part affinity fields," arXiv preprint arXiv: 1812.08008, 2018.

Z. Cao, T. Simon, S.-E. Wei, and Y. Sheikh, "Realtime multi-person 2d pose estimation using part affinity fields," in Proceedings of the IEEE Conference on Computer Vision and Pattern Recognition, 2017, pp. 7291-7299.

J. Carreira, P. Agrawal, K. Fragkiadaki, and J. Malik, "Human pose estimation with iterative error feedback," in Proceedings of the IEEE conference on computer vision and pattern recognition, 2016, pp. 4733-4742.

A. Cavallaro, "Privacy in video surveillance [in the spotlight]," IEEE Signal Processing Magazine, vol. 2, no. 24, pp. 168-166, 2007.

Y. Chen, Z. Wang, Y. Peng, Z. Zhang, G. Yu, and J. Sun, "Cascaded pyramid network for multi-person pose estimation," in Proceedings of the IEEE Conference on Computer Vision and Pattern Recognition, 2018, pp. 7103-7112.

Q. Dang, J. Yin, B. Wang, and W. Zheng, "Deep learning based 2d human pose estimation: A survey," Tsinghua Science and Technology, vol. 24, no. 6, pp. 663-676, 2019.

H.-S. Fang, S. Xie, Y.-W. Tai, and C. Lu, "Rmpe: Regional multi-person pose estimation," in Proceedings of the IEEE International Conference on Computer Vision, 2017, pp. 2334-2343.

A. Fitwi, Y. Chen, and S. Zhu, "A lightweight blockchain-based pri-vacy protection for smart surveillance at the edge," arXiv preprint arXiv:1909.09845, 2019.

I. Goodfellow, J. Pouget-Abadie, M. Mirza, B. Xu, D. Warde-Farley, S. Ozair, A. Courville, and Y. Bengio, "Generative adversarial nets," in Advances in neural information processing systems, 2014, pp. 2672-2680.

L. F. Herrera-Quintero, J. C. Vega-Alfonso, K. B. A. Banse, and E. C. Zambrano, "Smart its sensor for the transportation planning based on iot approaches using serverless and microservices architecture," IEEE Intelligent Transportation Systems Magazine, vol. 10, no. 2, 2018.

G. Hidalgo, Y. Raaj, H. Idrees, D. Xiang, H. Joo, T. Simon, and Y. Sheikh, "Single-network whole-body pose estimation," in Proceed-ings of the IEEE International Conference on Computer Vision, 2019, pp. 6982-6991.

E. Insafutdinov, L. Pishchulin, B. Andres, M. Andriluka, and B. Schiele, "Deepercut: A deeper, stronger, and faster multi-person pose estimation model," in European Conference on Computer Vision. Springer, 2016, pp. 34-50.

U. Iqbal and J. Gall, "Multi-person pose estimation with local joint-to-person associations," in European Conference on Computer Vision. Springer, 2016, pp. 627-642.

Z. Ji, Y. Ma, Y. Pang, and X. Li, "Query-aware sparse coding for web multi-video summarization," Information Sciences, vol. 478, pp. 152-166, 2019.

D. Kang, P. Bailis, and M. Zaharia, "Challenges and opportunities in dnn-based video analytics: A demonstration of the blazeit video query engine." in CIDR, 2019.

A. Krylovskiy, M. Jahn, and E. Patti, "Designing a smart city internet of things platform with microservice architecture," in Future Internet of Things and Cloud (FiCloud), 2015 3rd International Conference on. IEEE, 2015, pp. 25-30.

D. Nagothu, R. Xu, S. Y. Nikouei, and Y. Chen, "A microservice-enabled architecture for smart surveillance using blockchain technology," in 2018 IEEE International Smart Cities Conference (ISC2). IEEE, 2018, pp. 1-4.

A. Newell, K. Yang, and J. Deng, "Stacked hourglass networks for human pose estimation," in European conference on computer vision. Springer, 2016, pp. 483-499.

S. Y. Nikouei, Y. Chen, S. Song, and T. R. Faughnan, "Kerman: A hybrid lightweight tracking algorithm to enable smart surveillance as an edge service," in 2019 16th IEEE Annual Consumer Communications & Networking Conference (CCNC). IEEE, 2019, pp. 1-6.

S. Y. Nikouei, R. Xu, Y. Chen, A. Aved, and E. Blasch, "Decentralized smart surveillance through microservices platform," in Sensors and Systems for Space Applications XII, vol. 11017. International Society for Optics and Photonics, 2019, p. 110170K.

S. Y. Nikouei, R. Xu, D. Nagothu, Y. Chen, A. Aved, and E. Blasch, "Real-time index authentication for event-oriented surveillance video query using blockchain," in 2018 IEEE International Smart Cities Conference (ISC2). IEEE, 2018, pp. 1-8.

X. Sun, J. Shang, S. Liang, and Y. Wei, "Compositional human pose regression," in Proceedings of the IEEE International Conference on Computer Vision, 2017, pp. 2602-2611.

F. Wang and Y. Li, "Beyond physical connections: Tree models in human pose estimation," in Proceedings of the IEEE Conference on Computer Vision and Pattern Recognition, 2013, pp. 596-603.

H. Wang, C. Deng, J. Yan, and D. Tao, "Asymmetric cross-guided attention network for actor and action video segmentation from natural language query," in Proceedings of the IEEE International Conference on Computer Vision, 2019, pp. 3939-3948.

S.-E. Wei, V. Ramakrishna, T. Kanade, and Y. Sheikh, "Convolutional pose machines," in Proceedings of the IEEE Conference on Computer Vision and Pattern Recognition, 2016, pp. 4724-4732.

R. Xu, Y. Chen, E. Blasch, and G. Chen, "Blendcac: A blockchain-enabled decentralized capability-based access control for iots," in the IEEE International Conference on Blockchain, Selected Areas in IoT and Blockchain. IEEE, 2018.

R. Xu, S. Y. Nikouei, Y. Chen, S. Song, A. Polunchenko, C. Deng, and T. Faughnan, "Real-time human object tracking for smart surveillance at the edge," in the IEEE International Conference on Communications (ICC), Selected Areas in Communications Symposium Smart Cities Track. IEEE, 2018.

X. Xu, T. M. Hospedales, and S. Gong, "Discovery of shared semantic spaces for multiscene video query and summarization," IEEE Transac-tions on Circuits and Systems for Video Technology, vol. 27, no. 6, pp. 1353-1367, 2016.

Y. Yang and D. Ramanan, "Articulated pose estimation with flexible mixtures-of-parts," in CVPR 2011. IEEE, 2011, pp. 1385-1392.

D. Yu, Y. Jin, Y. Zhang, and X. Zheng, "A survey on security issues in services communication of microservices-enabled fog applications," Concurrency and Computation: Practice and Experience, p. e4436, 2018.

X. Zhu, Y. Jiang, and Z. Luo, "Multi-person pose estimation for pose-track with enhanced part affinity fields," in ICCV PoseTrack Workshop, vol. 3, 2017, p. 7.

What is claimed is:

1. A method for querying data obtained from a distributed sensor network, comprising:
   receiving sensor data representing an aspect of an environment with a sensor of the distributed sensor network;
   communicating a representation of the sensor data to a fog node through an automated communication network;
   determining, by the fog node, a correspondence of a query received through the automated communication network to characteristics of the representation of the sensor data; and
   selectively communicating, in response to the query, at least one of:
   the sensor data having the determined characteristics corresponding to the query,
   an identification of the sensor data having the determined characteristics corresponding to the query, and
   the data representing the sensor data having the determined characteristics corresponding to the query.

2. The method according to claim 1, wherein:
   the sensor of the distributed sensor network comprises a video surveillance camera configured to generate a stream of video images as the sensor data, having an associated automated processor configured to extract features of the stream of video images as the representation of the sensor data; and
   the query comprises at least one of a movement, a color, a size and a shape morphology of an object.

3. The method according to claim 1, wherein the query comprises a semantic query, the sensor data comprises surveillance video, the representation of the sensor data comprises extracted features of the surveillance video, and the characteristics of the representation of the sensor data comprise a color.

4. The method according to claim 1, wherein the fog node comprises a deep neural network trained on a semantic space of the query with respect to characteristics of the representation of the sensor data.

5. The method according to claim 1, wherein the fog node comprises a statistical inference model relating a semantic space of the query with characteristics of the representation of the sensor data.

6. The method according to claim 1, wherein the query describes clothing of a person.

7. An intermediate node for a distributed sensor network, comprising:
a communication port configured to communicate with an automated communication network;
a memory; and
at least one automated processor, configured to:
control the communication port to receive a communication representing data from a sensor node;
determine characteristics of the data using at least one of machine learning and statistical inference;
storing the feature data in the memory;
receive a query through the communication port;
determine a correspondence of the query to the characteristics; and
releasing data from the sensor node selectively in dependence on the correspondence of the query to the characteristics.

8. The node according to claim 7, further comprising:
a sensor node comprising:
a video surveillance camera configured to generate a stream of video images as the sensor data; and
an automated processor configured to extract features of the stream of video images; and
transmit the communication representing data from the sensor node.

9. The node according to claim 7, the query comprises at least one of a movement, a color, a size, and a shape morphology of an object.

10. The node according to claim 7, wherein:
the query comprises a semantic query;
the communication representing data from the sensor node comprises surveillance video; and
the characteristics of the sensor data comprise a color.

11. The node according to claim 7, wherein the node comprises a deep neural network trained on a semantic space of the query with respect to characteristics of the representation of the data.

12. The node according to claim 7, wherein the node comprises a statistical inference model relating a semantic space of the query with characteristics of the representation of the sensor data.

13. The node according to claim 7, wherein the query describes clothing of a person.

14. A system comprising:
a plurality of cameras, each camera of the plurality of cameras having a distinct geolocation;
at least one computing device in electronic communication with each of the plurality of cameras, the at least one computing device being configured to determine whether an object of interest is present in frames captured by at least one camera of the plurality of cameras, the at least one computing device being configured to:
generate object data relating to at least one object included in a frame captured by each of the plurality of cameras;
receive a query describing an object of interest;
determine if the object of interest is included in any of the frames captured by each of the plurality of cameras based on the generated object data;
identify at least one matching frame captured by at least one camera of the plurality of cameras that includes the object of interest; and
provide match data relating to at least one of:
the at least one matching frame including the object of interest defined in the query, or
the at least one camera of the plurality of cameras that captured the at least one matching frame including the object of interest defined in the query.

15. The system of claim 14,
wherein the provided match data relating to the at least one matching frame includes at least one of:
a frame time in which the object of interest is included in the at least one matching frame,
a visual depiction of the object of interest included in the at least one matching frame, or
information relating to the object of interest based on the generated object data;
wherein the provided match data related to the at least one camera of the plurality of cameras that captured the at least one matching frame includes at least one of:
a camera ID associated with the at least one camera, or
a geolocation of the at least one camera; and
wherein the received query defines the object of interest by at least one of:
identifying the object of interest as one of an inanimate object, an animal, or a person,
specifying feature characteristics of the object of interest, or
providing keywords describing the object of interest.

16. The system of claim 14, wherein the feature characteristics of the object comprises at least one of a gender, a movement, and a color.

17. The system of claim 14, wherein the at least one computing device generates the object data relating to at least one object included in the frame captured by each of the plurality of cameras by generating keypoint data based on humans detected in the frame captured by each of the plurality of cameras.

18. The system of claim 17, wherein the at least one computing device generates the object data relating to at least one object included in the frame captured by each of the plurality of cameras by further generating a confidence score for at least one of a body-joint of the humans predicted using the keypoint data and a part affinity fields for parts association using the keypoint data.

19. The system of claim 14, wherein the at least one computing device comprises:
a first plurality of edge nodes, each of the first plurality of edge nodes associated with and in direct communication with one camera of the plurality cameras;
a first fog node associated with and in direct communication with each of the first plurality of edge nodes; and
a cloud node in communication with the first fog node,
wherein the query is received by the first fog node from the cloud node, and the cloud node is isolated from the frames captured by at least one camera of the plurality of cameras unless the frames comprise the object of interest.

20. The system of claim 19, wherein the at least one computing device further comprises:
a second plurality of edge nodes, distinct from the first plurality of edge nodes, each of the second plurality of edge nodes associated with and in direct communication with one camera of a distinct plurality cameras; and a second fog node associated with and in direct communication with each of the second plurality of edge nodes, wherein the distinct plurality of cameras are distinct from the plurality of cameras, and wherein the query is received by the second fog node from the cloud node, and the cloud node is isolated from the frames captured by at least one camera of the distinct plurality of cameras unless the frames comprise the object of interest.

* * * * *